(12) United States Patent
Epstein

(10) Patent No.: US 11,734,418 B1
(45) Date of Patent: *Aug. 22, 2023

(54) SYSTEM AND METHOD FOR TRUSTWORTHINESS, REPUTATION, PROVENANCE, AND MEASUREMENT OF SOFTWARE

(71) Applicant: Joseph Alan Epstein, Pleasanton, CA (US)

(72) Inventor: Joseph Alan Epstein, Pleasanton, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/987,594

(22) Filed: Nov. 15, 2022

Related U.S. Application Data

(63) Continuation of application No. 16/858,668, filed on Apr. 26, 2020, now Pat. No. 11,550,903.

(51) Int. Cl.
| | |
|---|---|
| *G06F 21/55* | (2013.01) |
| *G06F 21/53* | (2013.01) |
| *G06F 21/62* | (2013.01) |
| *G06F 21/56* | (2013.01) |
| *G06F 21/57* | (2013.01) |

(52) U.S. Cl.
CPC ........... *G06F 21/552* (2013.01); *G06F 21/53* (2013.01); *G06F 21/566* (2013.01); *G06F 21/57* (2013.01); *G06F 21/6218* (2013.01)

(58) Field of Classification Search
CPC ........ G06F 21/552; G06F 21/53; G06F 21/52; G06F 21/566; G06F 21/57; G06F 21/6218
See application file for complete search history.

(56) References Cited

U.S. PATENT DOCUMENTS

| | | | | |
|---|---|---|---|---|
| 6,088,779 A * | 7/2000 | Bharadhwaj | ............ | G06F 9/461 711/147 |
| 7,613,907 B2 * | 11/2009 | Kaabouch | ............... | G06F 21/52 712/245 |
| 9,633,158 B1 * | 4/2017 | Jones | ....................... | G06F 30/34 |
| 10,025,927 B1 * | 7/2018 | Khalid | .................. | G06F 21/556 |
| 10,102,380 B2 * | 10/2018 | McKeen | ................. | G06F 21/72 |
| 2009/0132823 A1 * | 5/2009 | Grimen | ............ | H04N 21/43853 713/168 |
| 2009/0307500 A1 * | 12/2009 | Sato | ........................ | G06F 21/14 713/190 |
| 2010/0199354 A1 * | 8/2010 | Eker | ....................... | G06F 21/14 726/26 |
| 2012/0284792 A1 * | 11/2012 | Liem | ....................... | G06F 21/52 726/22 |

(Continued)

*Primary Examiner* — Gary S Gracia

(57) ABSTRACT

In accordance with some embodiments, a method and system for establishing the trustworthiness of software and running systems by analyzing software and its provenance using automated means. In some embodiments, a risk score is produced. In some embodiments, software is analyzed for insecure behavior or structure. In some embodiments, parts of the software are hardened by producing possibly multiple different versions of the software with different hardening techniques applied, and a choice can be made based on user or environmental needs. In some embodiments, the software is verified and constraints are enforced on the endpoint using techniques such as verification injection and secure enclaves. In some embodiments, endpoint injection is managed through container orchestration.

20 Claims, 25 Drawing Sheets

Execution

Analysis

(56) References Cited

U.S. PATENT DOCUMENTS

| | | | | |
|---|---|---|---|---|
| 2012/0317645 | A1* | 12/2012 | Fortier | G06F 21/566 |
| | | | | 726/24 |
| 2013/0111587 | A1* | 5/2013 | Goel | G06F 21/577 |
| | | | | 726/25 |
| 2014/0006803 | A1* | 1/2014 | Bodis | G06F 21/51 |
| | | | | 713/189 |
| 2014/0229669 | A1* | 8/2014 | Sandstrom | G06F 9/50 |
| | | | | 711/112 |
| 2016/0132667 | A1* | 5/2016 | Freitas Fortuna dos Santos | |
| | | | | G06F 21/125 |
| | | | | 713/189 |
| 2016/0259941 | A1* | 9/2016 | Vasudevan | H04L 63/20 |
| 2017/0208067 | A1* | 7/2017 | Sriramakrishnan | |
| | | | | G06F 21/6218 |
| 2017/0262892 | A1* | 9/2017 | Fernando | G06Q 20/02 |
| 2017/0286721 | A1* | 10/2017 | Xing | G06F 21/74 |
| 2018/0046823 | A1* | 2/2018 | Durham | H04L 9/3236 |
| 2018/0114012 | A1* | 4/2018 | Sood | G06F 21/79 |
| 2018/0183578 | A1* | 6/2018 | Chakrabarti | H04L 9/0861 |
| 2018/0183580 | A1* | 6/2018 | Scarlata | G06F 21/53 |
| 2018/0247055 | A1* | 8/2018 | Curtis | G06F 21/554 |
| 2018/0247082 | A1* | 8/2018 | Durham | G06F 8/63 |
| 2019/0042764 | A1* | 2/2019 | Durham | G06F 21/602 |
| 2019/0044729 | A1* | 2/2019 | Chhabra | H04L 9/14 |
| 2019/0147184 | A1* | 5/2019 | Zhang | H04W 12/35 |
| | | | | 726/30 |
| 2019/0229924 | A1* | 7/2019 | Chhabra | H04L 9/0637 |
| 2020/0311268 | A1* | 10/2020 | Kostyushko | G06F 21/561 |
| 2020/0342100 | A1* | 10/2020 | Goldstein | G06F 21/52 |
| 2021/0056205 | A1* | 2/2021 | Gorelik | H04L 63/1491 |
| 2021/0097037 | A1* | 4/2021 | Babol | G06F 11/1004 |
| 2021/0173622 | A1* | 6/2021 | Craik | G06F 9/44521 |
| 2021/0234875 | A1* | 7/2021 | Hecht | H04L 63/1416 |

* cited by examiner

SYSTEM AND METHOD FOR TRUSTWORTHINESS, REPUTATION, PROVENANCE, AND MEASUREMENT OF SOFTWARE

CROSS REFERENCE TO RELATED APPLICATION

This is a continuation of and claims priority and benefit to patent application Ser. No. 16/858,668, filed Apr. 26, 2020 by the present inventor, which further claims the priority and benefit to provisional patent application Ser. No. 62/839,595, filed Mar. 26, 2019 by the present inventor, the entire content of which is hereby incorporated by reference.

BACKGROUND OF THE INVENTION

1. Field of the Invention

The present invention relates to the field of evaluating software systems and individual software instances for security risk, collecting the provenance of that software, hardening those systems, enforcing strong protections on the endpoints of execution, and ensuring trustworthiness.

2. Description of the Prior Art

Ensuring that the software running on a computer is trustworthy and unmodified is an important goal in our times, where adversaries have shown unprecedented ability to deliver attacks into vulnerable code and vulnerable systems. Attackers can leverage bugs to modify executable memory, thus introducing new code into an existing system. Or they can overflow data areas, allowing modification of the stack—and crucially, the return address on the stack—or heap to construct jump- and return-oriented programming that can usually execute arbitrary instructions without modifying the data. Or they can work in the supply chain itself, modifying code by introducing bugs or vulnerabilities that they know how to exploit, or simply insert bad logic into the program. Open-source projects are particularly vulnerable to this sort of malfeasance.

This has been an area of active research, including by the present inventor: see U.S. Pat. Nos. 8,932,226; 9,747,172; 9,535,855; 9,336,383; 9,229,881, and so on, all of which disclose methods for creating and providing enforcement of the integrity of systems, including the use of hypervisors for security. In general, existing solutions today to integrity are based on primarily static information, and thus do not accommodate a changing threat landscape and greater knowledge about particular vulnerabilities in particular software assets. One such existing solution is that of integrity measurement. The idea is that a particular software image is signed, usually using a precise certificate authority infrastructure instance. Then if anyone tries to modify the signed image, the signature won't pass. This signature is checked on software load. Monolithic load-time signatures like that have some value, but if the software is already vulnerable, as it is in many cases, locking down that software and enforcing that particular version merely ensures that the vulnerabilities must, undoubtedly, be loaded into memory. Specifically, the system has no idea of the trustworthiness of the software to be loaded. The software may already possess malicious behavior, perhaps through supply chain attacks on the trusted code base. Or perhaps the software is vulnerable to modification. The integrity measurement happens at load, not later: instead, the system usually relies on some sort of assumption about who can access the memory once verified, assumptions that are often violated in practice. For example, with secure enclave systems, the software is loaded into encrypted memory, which is then decrypted upon appropriate entry into the enclave. The integrity measurement occurred at the construction of the enclave. This is fine, until the enclave's software vulnerability is hit that forces it to modify its own executable code or code pointer tables. Moreover, if the code was statically linked—as it often has to be to run in that environment—but otherwise has a function pointer dispatch mechanism, the function pointers can be overwritten. Other systems have continuous integrity enforcement that applies to a whole image, but this is again of no help for already malicious or doubtful software, and also now, because those methods are insensitive to the fine-grained programming model, it sets requirements on the language facilities and the loading/linking of programs: continuous integrity may require statically or lightly dynamically linked software only, and thus not operate for larger applications or environments. Furthermore, in the past, the only pragmatic access to hooks for performing runtime verification were in the hypervisor (such as a binary translating hypervisor or using hardware page table hooks). Now, however, modern hardware allows for techniques such as non-executable memory to be controlled by the operating system directly, and to be requested by userspace applications for their own memory.

Moreover, it has been very difficult to produce until now a workable metric of the security of software. The assumption is mostly that some security is layered onto it, and that that amorphous security is somehow additive: much as two piles of sand merge into one bigger pile of sand, the degree or amount of security or protection of a system has been assumed to be an uncountably additive quantity. And yet, there is a precise and real need for the degree of security to be measured and compared. Users want to know what percentage of their runtime code has been verified, how strong the verification is, and what the likelihood of vulnerabilities throughout their deployments.

The solution is to be able to provide integrity, reputation, trustworthiness, coverage, and risk analysis, so that the endpoint enforcement mechanisms have enough information to go on to adapt to the changing landscape. Such an invention is disclosed below.

SUMMARY

In accordance with some embodiments, a method and system for measuring the risk of executing software and systems composed of that software, based in part on the provenance of the software, automatic code analysis, threat information, the practices of the organizations and people behind the software, and the enforcement posture of the software.

DETAILED DESCRIPTION

Figure 1:
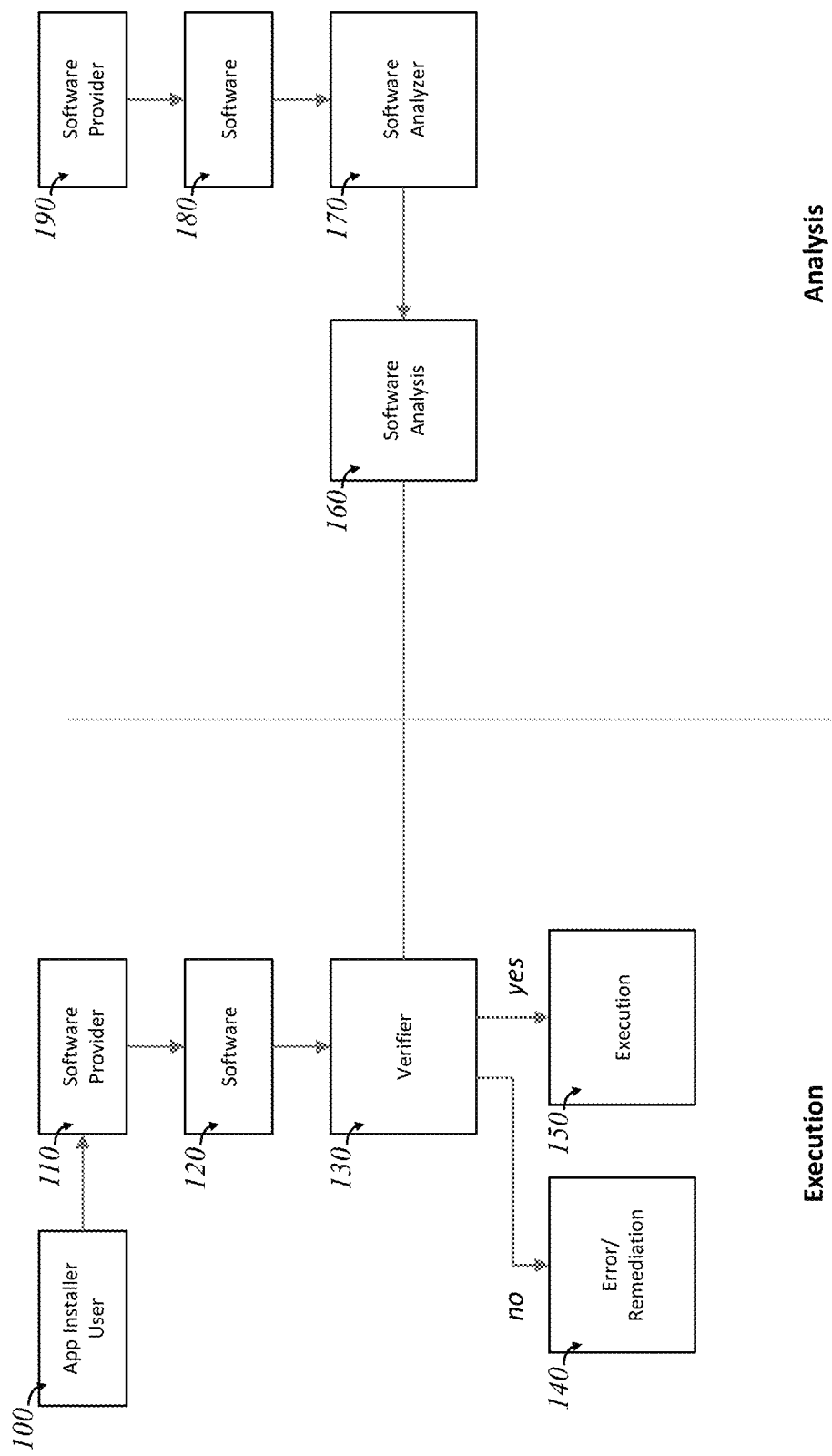
FIG. 1 is a diagram of an embodiment of the invention, showing the analysis and verification of software.

FIG. 1 shows the basic architecture of analysis and verification for some embodiments. On the analysis side (the right side of the figure), software 180 is provided by a software provider 190. Some software providers are the software publisher, a download site, or a source code site such as Github. The goal in some embodiments is to get the software from the horse's mouth, so to speak, to seek and use trustworthy sources, and to record the trustworthiness of the source no matter where the software came. This source tracing is known as provenance, and explains how many hands the software has passed through and why on its way to the analyzer. In some embodiments, the same piece of software is downloaded from as many different sources as possible, even if they purport to be of the same version. Each unique item of software (be it the same version but differing bitstreams, or different versions) is ran through an analyzer 170, which in some embodiments evaluates software for its fitness, vulnerability level, or malice. Results—one or more analyses 160—are then produced. In many embodiments, the analysis represents a detailed set of information, on whether this piece of software ought to be run, who produced it, how it differs from others that claim to be the same, what risks are produced when running it, and what mitigations can be taken.

This analysis 160 is then connected to execution. An application installer 100 procures software 120 from a software provider 110 and installs it. At some point—such as when the software is installed or when it is executed—a verifier 130 verifies the software 120 by requesting from the stored analyses 160 to find a match and then verify that the match is correct. If the match is correct, the system can proceed to execution 150. If not, the system will be directed through error or remediation proceedings 140 to rectify the problem.

Figure 2:
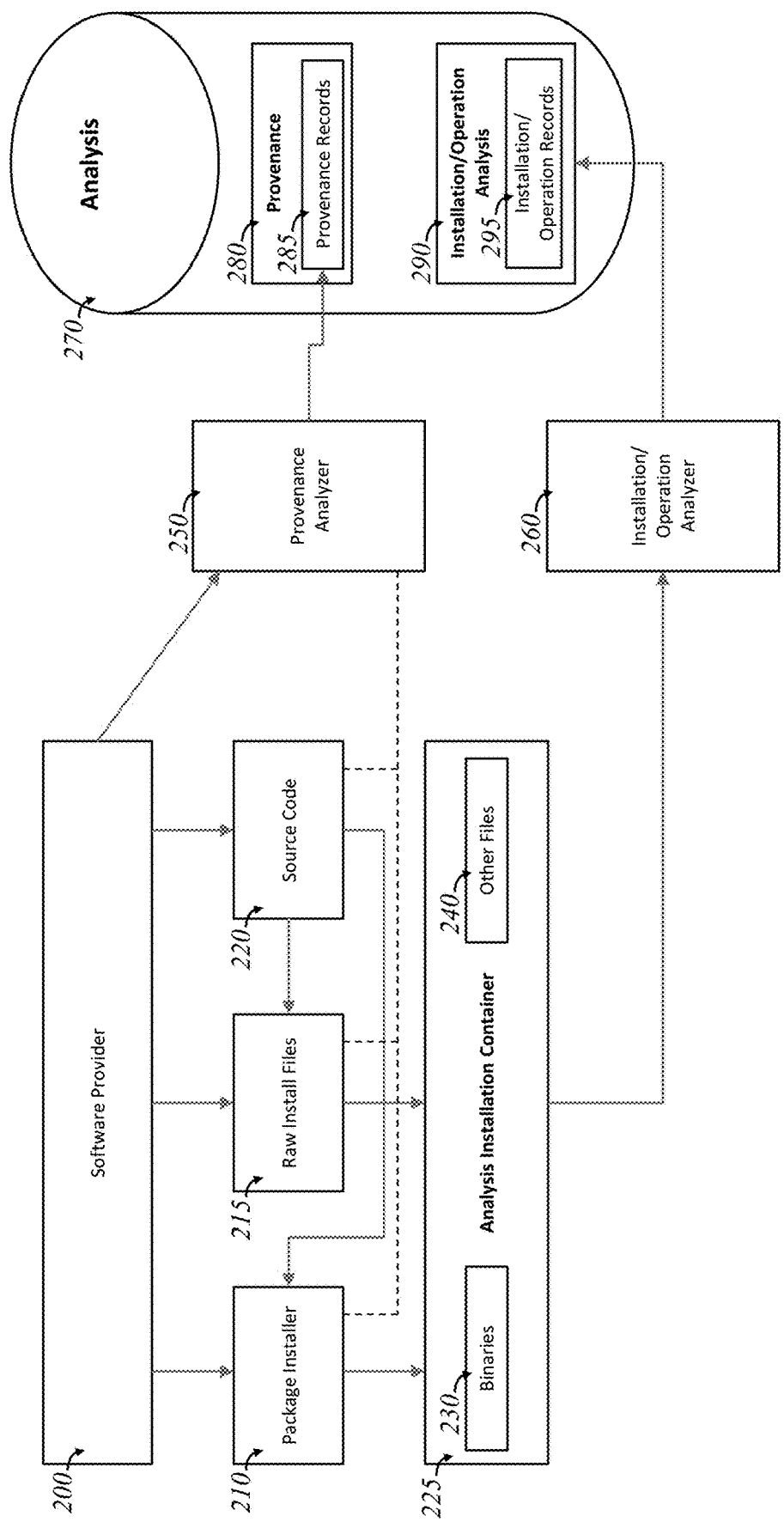
FIG. 2 is a diagram of an embodiment of the invention, showing the discovery and analysis of the provenance of software.

FIG. 2 elaborates on the method of analysis in some embodiments. A software provider 200 is accessed to download at least one of the following: an installer package 210, raw install files 215, and source code 220. If there is source code 220, source code 220 is built to produce raw install files 215 or an installer package 210. Once produced, an analysis installation container 225 is set up. This container 225 is a possibly-raw functional system for the software to be installed to, containing the prerequisites for the installation. Installation is performed, such as by using the installer package 210 or by delivering raw install files 215 into the container 225. After the installation, the container 225 is no longer pristine, but includes all of the changes made to it from the base.

A provenance analyzer 250 analyzes the installation process (dashed lines are to avoid visual conflict with solid lines) and creates records 285 attributing the ultimate installed as-if-deployed files and other modifications to the package and provider. In some embodiments, the provenance analyzer endeavors to gather as much information about the provenance of the files or changes as possible.

Figure 3:
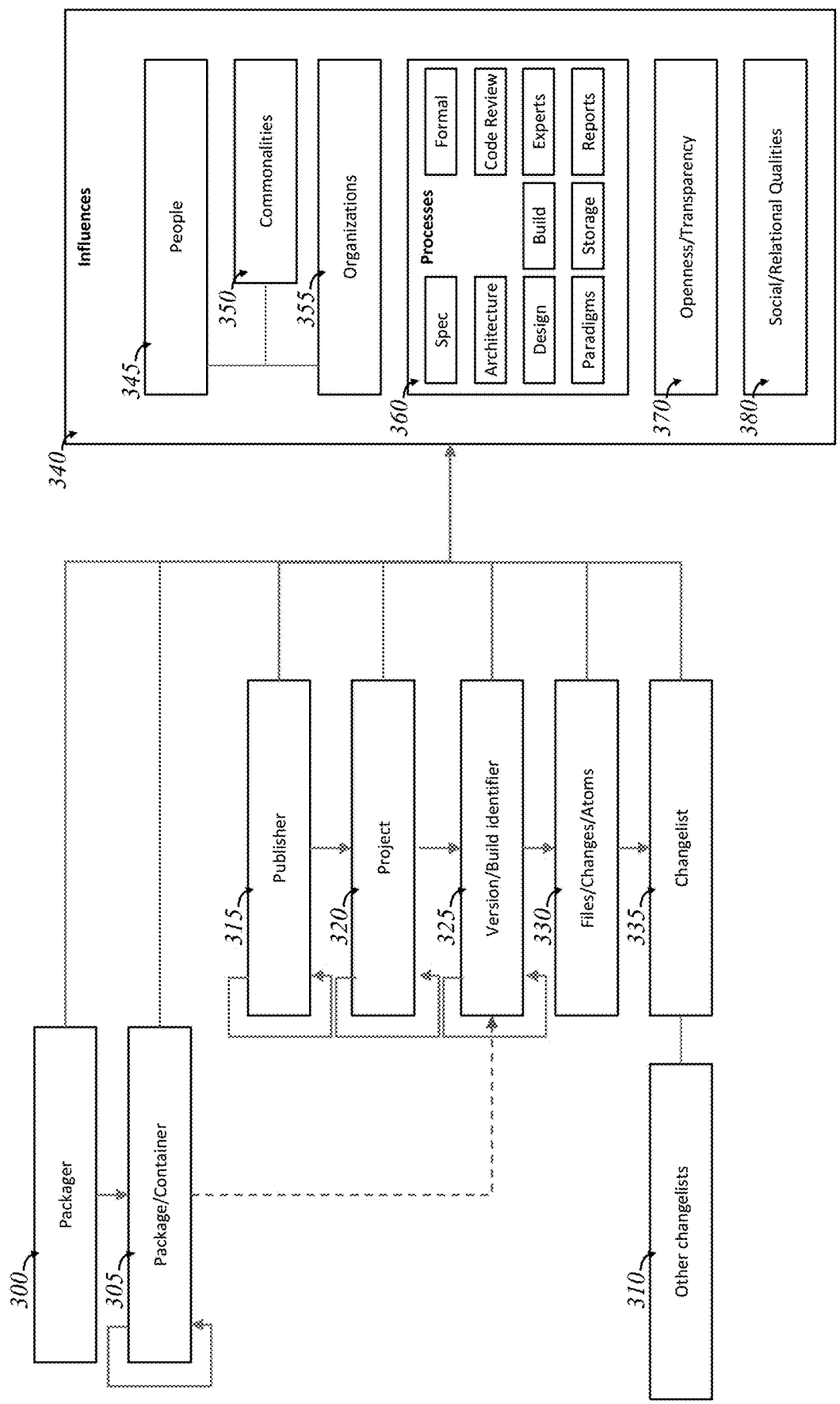
FIG. 3 is a diagram of an embodiment of the invention, showing a provenance graph.

FIG. 3 shows provenance relationships and data gathered by some embodiments, called a provenance graph. A publisher 315 can represent the organization who retains control over the project/product. For example, the Linux Foundation is the official publisher of record of the Linux kernel; Canonical is the official publisher of Ubuntu; Microsoft is the official publisher of Windows; Google is the official publisher of TensorFlow. This relationship need not necessarily be one-to-one; in some embodiments, publishers 315 can be nested or have past history retained, so that if TensorFlow becomes its own foundation, for example, the fact that Google was the original publisher can be retained. Below the publisher 315 is the project 320, representing the particular item: TensorFlow in this example would have a project for itself. Again, projects can be nested: TensorFlow Core belongs to TensorFlow Project. Below the project 320 comes the version/build identifier 325 meant to identify this particular software package. This too can be hierarchical, representing different environments, platforms, and subversions generated from the same codebase: examples are 32-bit vs 64-bit, CPU manufacturer, etc. Together, in order, the list of publisher(s), project(s), and version(s) produces a unique identifier of the entire deployment set. Beneath this set are files, changes, or other atoms of state 330 captured from the installation, and below 330 are changes 335 that were applied to that from the previous version or previous dates. An atom under a unique identifier is globally unique in some further embodiments; changelists below provide the annotated changes, such as source code logs and changelist numbers. Each changelist 335 may also refer to other changelists 310 (and thus, hierarchically, to their other relationships: this is not shown as directly recursive on the figure to clearly distinguish what is part of a unique identifier from what is merely a relationship), to identify from whence it came and to shadow the branching/merging structure as known or available. Some embodiments further have representations of packagers 330 who created a particular package and a package or packages 305 (or subpackages via recursion). These representations allow for the provenance to continue past the production of a particular build to software asset and lifecycle management. Packages in some embodiments contain specific build versions (such as having a particular build version of Tensorflow installed, along with other packages representing the dependencies, and together represented by a larger package that is a Docker container). In those cases, some embodiments construct a larger unique identifier starting with the head package and appending the packages as a prefix (in order on an ordered list or concatenation) for the producer-based identifier above.

For each of the items it is possible to capture contributors and influencers 340 and their attendant organizations. For example, in an open source project, this captures the identity of the person who committed the change, and who that person works for or ever has. The goal in those embodiments is to capture a portrait of the people who have contributed to the changes, projects, or other elements of the provenance: basically, to capture the fingerprints along the supply chain. In some embodiments, the individuals 345 are tagged to their organizations 355 with when they started, how long they were involved, and the quality or degree of relationship during one or more intervals. In some embodiments, the individuals are identified to their past and current "resumes", such as LinkedIn or other social media profiles, press releases, quotes, speaking listings, or other available information identifying the person to the organization. Organizational relations can be fluid and indistinct at times: a person may be employed with one organization, contributes in their spare time to another, and an advisor to a third group, for example. In some embodiments, the nature (and/or degree of certainty of knowledge) of the relationship is maintained. This multiplicity of relationships is important, and the publisher is likely of the same type as the organizations in the Influences box. This actually allows for a complex web of relationships to be captured: which organization influences which project, and how: be it common or overlapping contributors, employees, etc. Commonalities 350 includes these overlapping relationships, in some embodiments: picture that the same people attend the same conference five times a year; the commonalities in some embodiments is then a database entry representing the conference, joining it to the project, and then joining it to the list of individuals and companies who have attended. Furthermore, among the influences can be the processes 360 that the project or element within used, which may include without limitation: the specification process, the architecture and design processes, the paradigms used in the design and implementation (such as modularity, code boundaries, abstractions, modes of development and operation, execution paradigms such as separation of privileges, shared memory, enforcement techniques, compilation methods, protections for security, and so on), the existence and quality of any formal proof or code verification (especially for cryptograph algorithms or other critical infrastructure), the nature and degree of code review (including process gates, regression testing, and so on), the experts who have qualified the parts of the system and their assessments, bug and exploit reports (including the quality of the processes and statistical analysis of the reports and their tie ins to contributors), the build processes (including the independent and dependent metrics of the steps of the processes), and the quality (such as accessibility and vulnerability) of the storage of the images (including both the technical storage the applications use as they operate, as well as the storage of the builds themselves by the suppliers and the weaknesses or strengths in the image supply chain). Furthermore, the openness or transparency of 370 of organizations or people, and the social and relational qualities 380 can be stored. These influences, like the others, can have their own reputation, risk assessment, quality assessment, and other metrics attached.

In some embodiments, this information is used in manual remediation, in determining how a vulnerability or malicious behavior entered into a project, and thus capturing the forensics of the people who touched the project and how. Databases such as the one just disclosed can capture the entire "blame" analysis of every line of code of an open source project and how it came to be vulnerable. When tied in with an observed vulnerability, this database can make the forensics much cleaner and faster to perform. Therefore, in some embodiments, most elements of the provenance database in FIG. 3 are able to be associated with a reputation. Reputation can apply to a particular act: the reputation can be set low for a variety of reasons, such as whether the act was reputable, or whether a patch was known to be an attack. It can be set high for other reasons, such as whether a patch or act was already known to be reputable. A reputation can apply to a file, a project, a person, or an organization. For example, it may be set low if the person 345 is known to be on a watchlist. In some embodiments, reputation is recorded as an optional field. In other embodiments, reputation is also recorded with the confidence of the result and its source. In some embodiments, reputation includes a risk assessment, which itself may be based on how thoroughly the source and structure of a program can be assessed, and thus can be updated dynamically with more knowledge of the system even if the software itself is not updates. In some embodiments, formal analysis and proofs can be submitted to a reputation authority—the entity that is producing the reputation analysis—for manual or automated inclusion in the reputation calculation.

Figure 4:
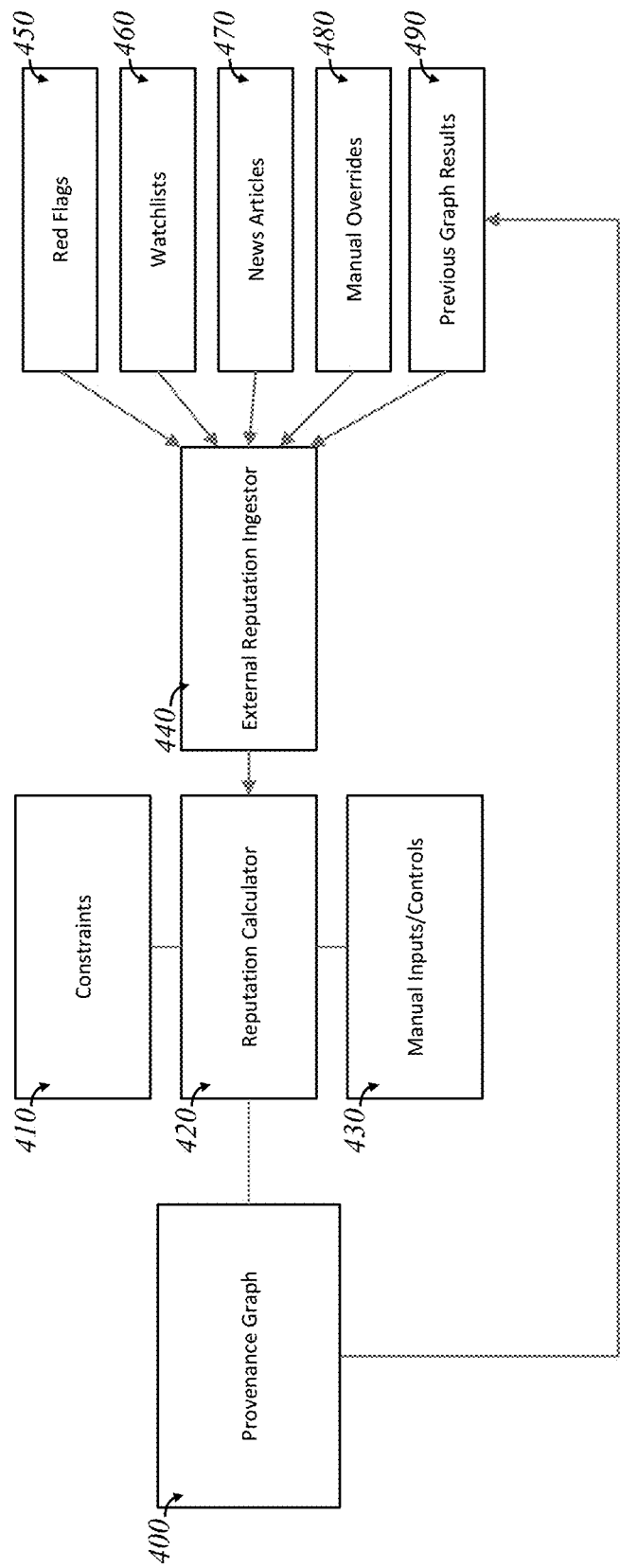
FIG. 4 is a diagram of an embodiment of the invention, showing the ingestion and calculation of reputation.

FIG. 4 shows a reputation calculator, used in some embodiments. A provenance graph 400 contains reputations of the items on it, as well as uncertainties or holes as mentioned above. A reputation calculator 420 addresses that graph, and taking in inputs as needed from constraints 410 (such as the limits of a reputation in a particular circumstance, in some embodiments implemented using a rules engine applied to the logic of the graph), manual inputs or controls 430, and external reputation from its ingestor 440, produces a new reputation set for the graph. In some embodiments, the ingestor 440 pulls information from red flags 450 (such as explicit bulletins from governmental or trusted security agencies [again, elements that can be represented in the provenance graph in some embodiments]), watchlists 460 (often provided by similar organizations), public news articles 470 (such as information derived from NLP matching looking for names as recognized in the graph), manual overrides 480 on external reputation, and previous results 490, and apply that to the calculator 420 as needed by the calculator for its update work. In some embodiments, freeform text is interpreted by a trained AI model (such as a DNN) to catch references to the items in question. Furthermore, the sources need not all be trustworthy: the sources themselves can have entries in the influences database, and the likelihoods or similar trust metrics can be rolled up (in the manner of what is disclosed below): also, the publications or external sources checked in some embodiments includes known publications or references to less trustworthy or bad actors, such as information made available by intelligence, including signals from bad actors as typically distributed, state publications, message boards (such as 4chan), "dark web" sources, social media. This information can include both chatter (public, semiprivate, and intercepted) and chatter. In some embodiments, reputations are propagated along the paths of the graph. Some embodiments use specific transitive functions to assign reputations to untagged items, or modify tagged ones, based on changes within the graph. In some embodiments, this can be performed using forward, backward, or other similar tree-like propagation methods, with specific internode relationships based on node type. This can also encompass hysteresis, to prevent node reputations from swinging too wildly when sufficient data has been gathered. Graph propagation of loosely correlated values is known to the art: examples are performed using utility analysis in multiplayer markets, or even in neural network propagation. In some embodiments, overrides can be set manually: some further ones will then propagate out from the changes to recompute the mesh. In some embodiments, the propagation involves Bayesian calculations (such as the framework described later, including Bayesian networks overlaid or distinct from the provenance graph), or frequentist equivalents or a blend of both.

Some embodiments don't use explicit propagation to assign or update the reputations, but use artificial intelligence. In some embodiments, the calculator has an AI engine. Some embodiments do this by using an adaptive machine learning algorithm (such as a neural network), where the input is the previous reputations on its graph and the new information, and the output is the new reputations. One possible value in using machine learning in this way is to allow iterative refinement of the recurrent data set. The data in such a graph can be tremendously large if collected well, and can include lots of older information. It may be difficult, depending on the data set and the environment, for people with deterministic tools to wade through such a graph and learn when certain signals matter and when others don't. The algorithm in use is applied piecemeal, in some embodiments. In some, the algorithm is focused on one domain at a time (such as a project): a preprocessing step may be performed to abstract out relevant information for the training of or decision from the network, such as flattening the list of contributors and assigning preprocessing contribution scores, instead of exposing the algorithm to each contributor list tied directly to each changelist. (Neural networks are not naively good at graph traversal, which is why a more deterministic preprocessing step can help produce better information for the network to absorb.) These one (or some) at a time steps are then be performed by some embodiments per project(s), for example as above, until the network is filled. Afterwards, a subsequent propagation step can be performed to resolve inequities or conflicts in the output data, to make it coherent. This too may be by using a neural network or learning algorithm. By doing it piecemeal, the training can be done multiply on individual domains (the projects in the example) rather than all at once on the domains together. A possible tradeoff depending on the implementation, as anticipated above, is that the outputs can produce disagreement on joint relationships between the domains (which can be resolved as above with a further pass), but the training ability and parallelizability are often superior. One embodiment explicitly uses projects as the domain. Some embodiments train the algorithm on open source projects by processing each one through a training session. Some embodiment uses supervised training, by correlating known forensic or intelligence reputations for entities with such an opinion available.

The second half of FIG. 2 shows installation/operation analysis 290. The installation/operation analysis 290 can take place on anything that the installer has left behind: files, state changes, registry changes, permissions, etc. These are the atoms of installation/operation in some embodiments. Note that some embodiments only operate on installation or extraction. Others operate on further operation, as described below.

Figure 5:
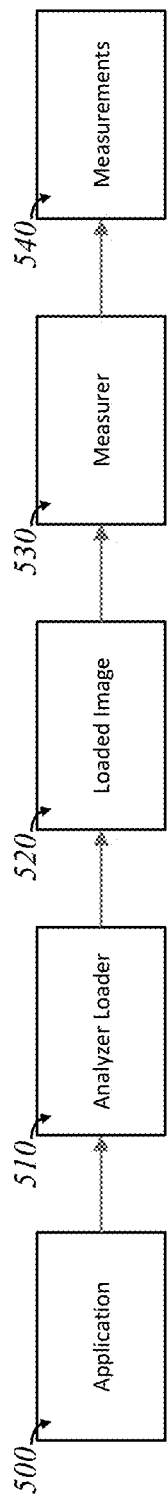
FIG. 5 is a diagram of an embodiment of the invention, showing the analysis and measurement of software.

FIG. 5 describes one method of installation/operation analysis, which is measurement. To measure an application is to determine what the expected invariant state of the application should be in a properly operating application. In some embodiments, the application 500 is represented as a loadable binary. In some embodiments, the application is represented by an installation package or tarball. In some embodiments, the application is represented by a disk image, such as a virtual machine (VM) image, or a deployment container, such as a Docker container. In the discussions that follow, it will be clear from context that the binary or binaries being analyzed may include their dependencies and their attendant packaging and/or container structures: in the interest of economy the elaboration may not be shown on the diagrams or in the descriptions at every step, but bear in mind that some embodiments use some part of the elaboration instead of or in addition to a raw binary.

The application 500, (a loadable binary and/or its dependencies, package structure, and container) is "loaded", in quotes because it may not be used operationally as a program and thus may have its loading state simulated—especially for just in time dynamic linking—by a specific analyzer loader 510 that is capable of producing at least a partial memory image or virtual image 520 for use by analyses. This loaded image 520 is then measured by a measurer 530 to produce a measurement 540. The possibly simplest measurement is, as mentioned at the top, raw static measurement, where the in-memory footprint that is known to not be stack or heap is hashed, and the hash compared with the signed hash of the expected measurement. As mentioned before, though, this only works for completely static, nonrelocatable code. A loader's job is to often modify the code on its way into memory, by processing relocation entries. Relocation entries can result in runtime linkages through a jump table: a dynamically written table, often containing memory indirect jumps where either the code for the jump or the memory indirection is modified when the symbol is resolved. Thankfully, more modern specifications have removed most relocations from the static code itself, and have replaced them with packed data tables that contain the relocations. This means that the relocation data tables are more important than ever to measure.

Figure 6:
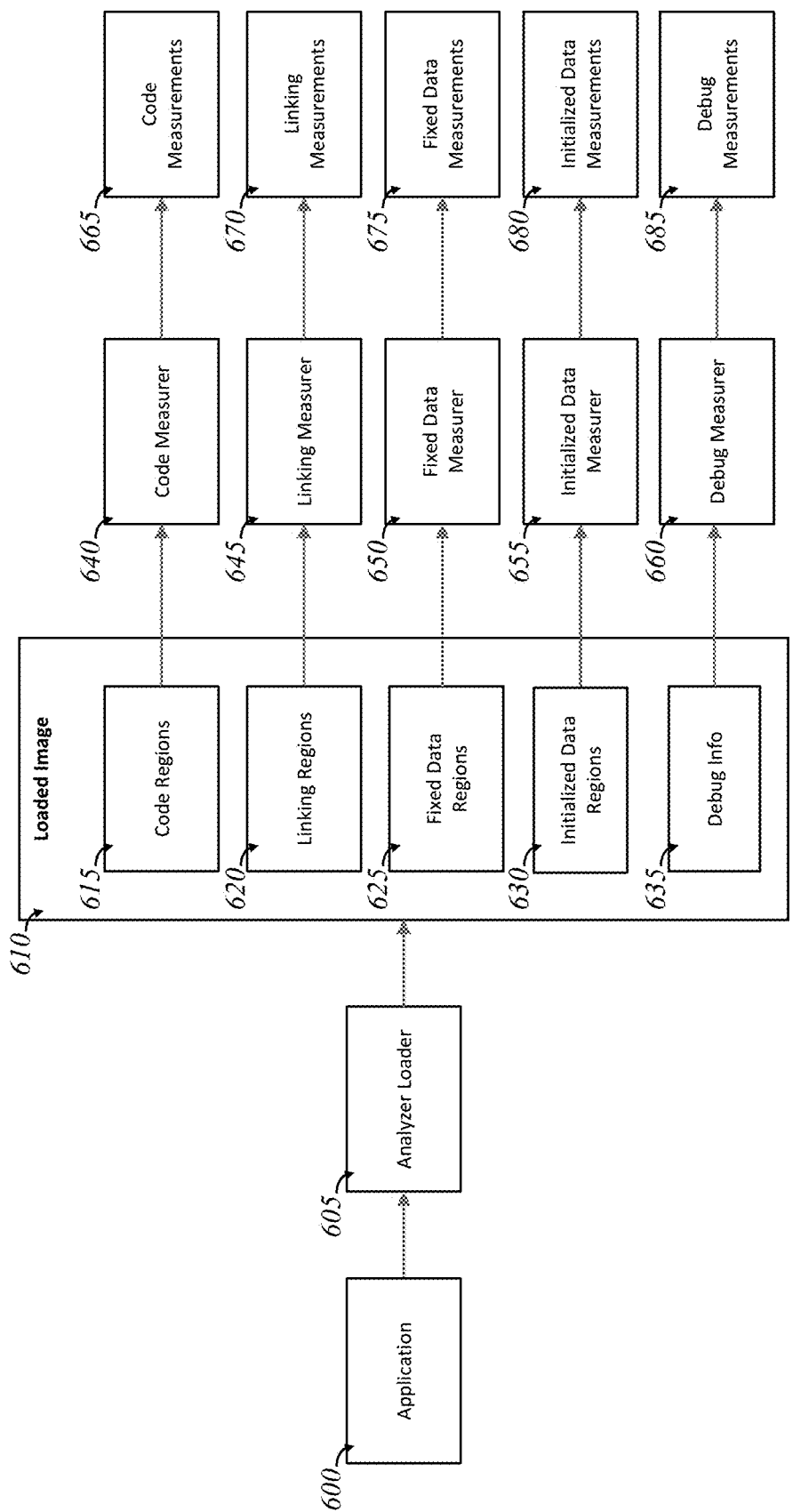
FIG. 6 is a diagram of an embodiment of the invention, showing the detailed measurement of the components of a loaded application.

FIG. 6 shows a more detailed measurement process, as used by some embodiments. An application 600, when loaded via analyzer loader 605, results in an image 610 with different memory regions. Code regions 615 contain static code. Linking regions 620 contain dynamically modified linking jump tables, as well as address offset tables for global memory. Fixed data regions 625 encompass memory the application never writes to, that is unchanging after load. Initiated data regions 630 are regions that do get modified, but that are initiated (even if to 0 such as in a BSS) by the application. Debug info 635 is additional metadata provided to represent symbols, line numbers, or other debugging information. Usually debugging information is not critically important for runtime use, but every once in a while an application may want that. Each region type may have a specific measurer, a subset or all of which may appear in some embodiments.

A code measurer 640 measures the static code 615. Since static code itself never changes, the regions can be individually measured by a cryptographic hash. This is per region in some embodiments; in some embodiments there is only one hash that is produced when the order can be determined in a fixed manner (such as alphabetically by region then image name without regard to how the images are loaded in memory by ASLR or other randomizers), encompassing multiple regions.

A linking measurer 645 measures relocation or linking tables or other portions of linking regions 620. Relocation entries stored in the binary provide for the locations of the linking entries. Most compilers and language/platform specifications now require that the dynamic linking tables are data tables, which are indirectly jumped to. (The indirections are not always the most efficient, and often look like a relative call to a memory indirect jump, depending on the platform.) Therefore, in most systems, it is sufficient to measure the symbolic (or ordinal offset) relocation tables present in the application, and perform out-of-band "relinking" based on the actual runtime segment relocations. In some embodiments, the library being linked to is also connected to the measurement with its own measurements, containing the exports from the library that this or other target binaries use. This allows not only for indirect linking table's layout to be measured, but for the destination location be fully measured to make sure that it is in fact the named function at that location. More on this in the description of the verification. In older systems or systems that do perform runtime code patching, awareness of that fact is needed: sadly, there are some "optimization" modes that allow for these indirections to be overwritten by the dynamic loader for a minor performance improvement. This is seen in some versions of the Linux kernel, for example, which uses more of a ".o" style linking than a ".so" style with PLTs when it can.

A fixed data measurer 650 measures the static fixed data 625: this can also be done in the manner of the fixed code. In some embodiments, the fixed code 640 and data measurer 650 is the same, and all fixed segments are measured without regard to their being code or data.

Debugging data 635 tends to be similar to relocations. It is measured by debug measurer 660, which often performs the measurement similarly to linking measurer 645. In most cases it won't even matter: debugging information is usually marked as not loadable, and so measuring it is static and also not a problem for running programs.

An initialized data measurer 655 measures initialized data regions 630, and is more complex in many embodiments. It is not generally possible to police the modifications of initialized data segments 630 without running the original logic (a variation of the halting problem). However, it is possible to gate the accesses, or to provide further validation logic through extra symbolic or compiler-process analysis of the code. Gating accesses to data is known in the art: in general, it involves ensuring through reachability analysis that only code that can access that data provably at runtime accesses it, or at least that code that is provably unable to access the data be prevented from accessing it. The problem is that pointer-arithmetic languages cannot be generally subject to this analysis, and so this becomes a somewhat more language specific effort. That being said, there is value to deeper compiler or binary analysis, especially on the determination of reputation.

Figure 7:
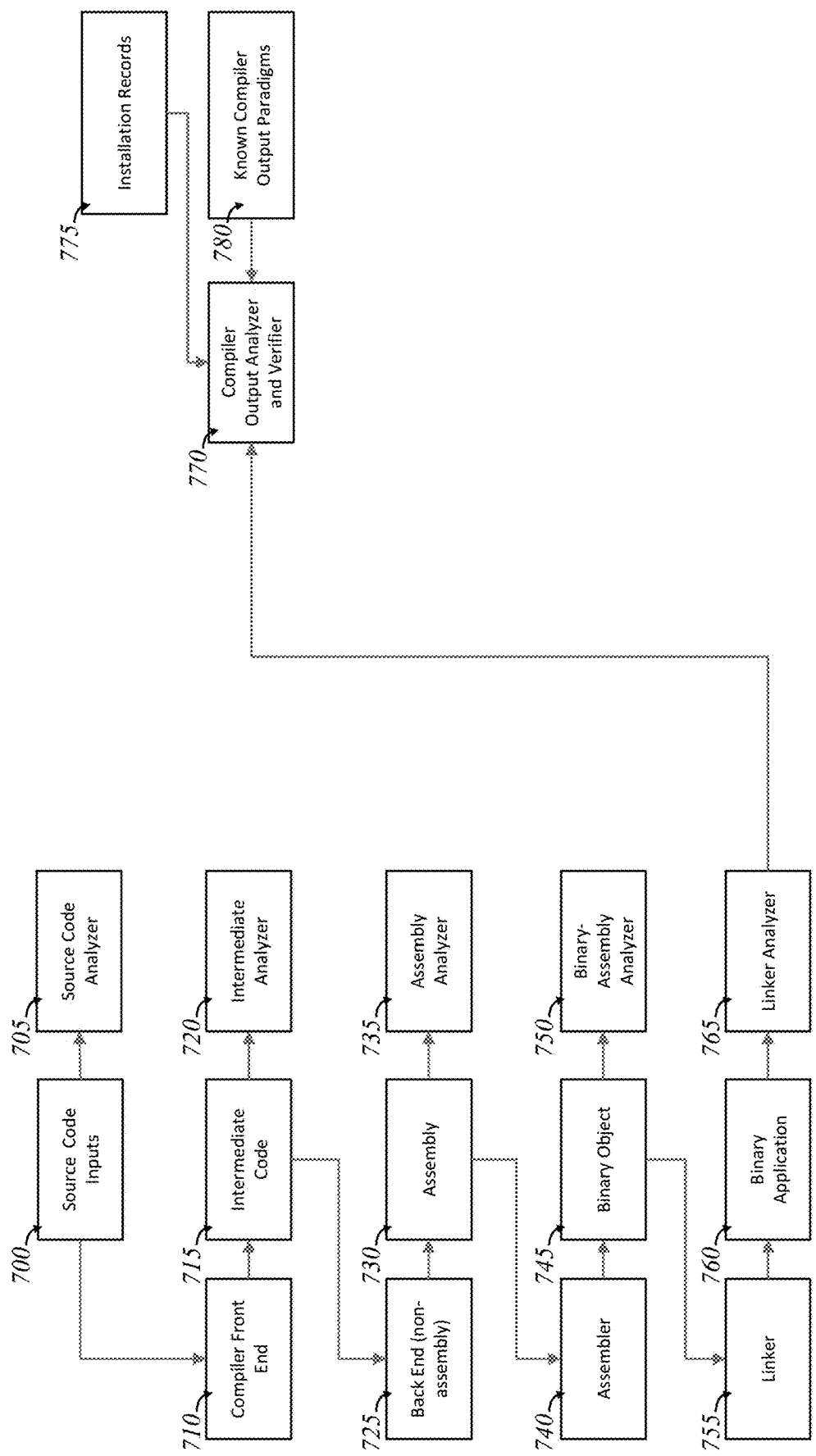
FIG. 7 is a diagram of an embodiment of the invention, showing structure analysis of the code generation process for an instance of software.

FIG. 7 shows structure analysis in some embodiments. One concept is that most programs are output by well-known compilers (such as via steps of 710, 725, 740, 755), and thus have a limited set of segments and patterns within the segments. Thus, it is possible to analyze and verify the output of a compiler based on those known paradigms. In some embodiments, a compiler output verifier and analyzer 770 uses known compiler output paradigms 780 to verify that the output is plausible. One method is to check the segment names and permissions against a list of allowed segments from the known output paradigms. An exception may need to be made for the few programs that do generate unusual segments—this happens for large projects that have built their own dynamic loader or cross-language code discovery mechanism that sometimes pollutes the runtime image. Such an exception is encoded in installation records 775, and can consist of merely the names of the unique—and thus if this is all that is done, unverifiable—segments. This lack of verification is used to compute a coverage ranking, which feeds into the determination of the risk and reputation of the particular binary: binaries with custom linking scripts and segments is necessarily more risky unless someone produces a custom verifier, in which case such risk assessments can be reassessed. The output paradigms can include the structure of the dynamic linking, so that the format of the linking can be verified even if the actual linking destinations are not. (For example, a PLT in Linux will be a relative memory address jump. It will not be any other instruction.)

In addition, the individual steps of compilation can lead to additional analysis. The compilation steps usually involve a front end 710, which produces an intermediate representation 715, a back end 725 that reduces the intermediate representation 715 (or post optimization) to assembly 730, and then to an assembler 740 which emits machine code such as in a binary object 745. Each step has certain constraints that can be inspected. The source code 700 can be analyzed by a source code analyzer 705. The intermediate code can be analyzed by an intermediate analyzer 720. The linker's results can be analyzed by a linker analyzer 765. One such analysis is of the production of linking tables. The assembly 730 can be analyzed by an assembly analyzer 735. One such analysis is performed on a normal symbolic call presented to the assembler—a "call symbol" sort of pseudoinstruction. The assembler produces the basic call with static relocations encoding the symbol as mapped to the linking library for the shared object. The linker converts the static relocation for the symbol, which itself is a standard production of the linker when asked to compile a shared object. These are filled with structure that can be measured and validated, even in the blind without knowledge of the particular destination locations. Some embodiments match the pattern of the GOT/PLT or IDATA/RDATA tables, looking for known compiler output formats and valid ranges. Again, the purpose is to assess whether the structure of the code departs from the known and safe structures, not to determine if it has been modified per se, which will already have been determined by measurement. Some embodiments assess how out of the ordinary, or how unsafe, the compiler's output is.

Figure 8:
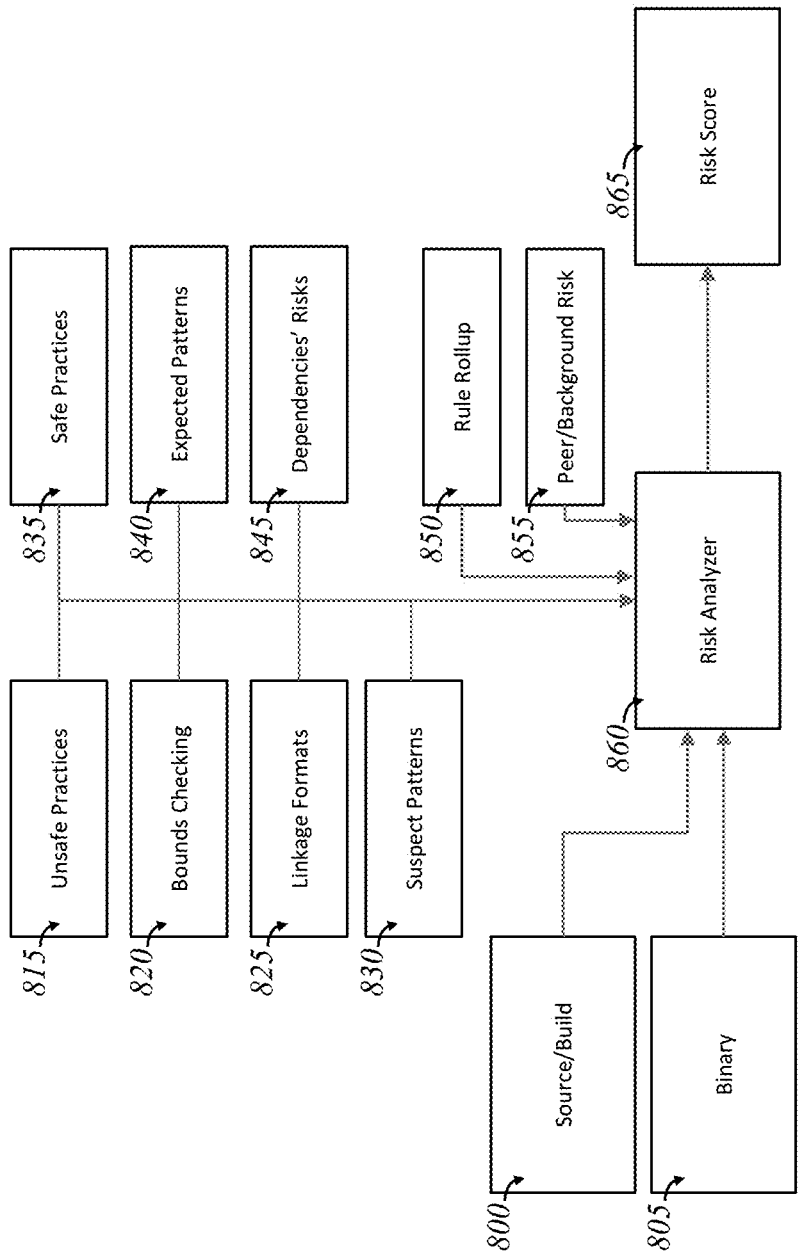
FIG. 8 is a diagram of an embodiment of the invention, showing a risk analyzer producing a risk score.

FIG. 8 highlights some further details of the above risk assessment in some embodiments. A risk analyzer 860 performs pattern matching or detail decomposition of a binary 805 (and/or dependencies, etc.) and/or the source/build(s) 800 for the binary. Some embodiments use a rules-based pattern matcher, where the inputs are necessarily patterns. Some embodiments use hand-built scripts or interpreted logic. Some use straight compiled code. The forms it matches against are based on known and expected constraints of the binary. Some embodiments access tables of one or more of safe practices 835, unsafe practices 815, and suspicious patterns 830 or practices (which itself in some embodiments is sourced or colored by the provenance). This can be rules and patterns, or it can be metapatterns. For example, static analysis of library calls can determine that a program is calling mprotect on its own memory space to create a writable executable region. This may be part of a JIT, or it may be sloppy execution. Pattern analysis can determine that the mprotect is a part of a valid (or even known) JIT. Or it may determine that it matches no pattern. In some embodiments, each rule or pattern is assigned a match and unmatch score. If the rule matches the binary, n points are added; if it fails, m are subtracted for the category, in some embodiments.

Some embodiments compare the number and type of safe practices, unsafe practices, and/or suspect patterns (among other things) to help develop the partial or total risk score 865. Some measure one or more of indirect table jumps, modifiable code, linker patterns, library or dependency risk, system call patterns or usages, library call patterns or usages, timing requests, novel or specific CPU instruction patterns (such as new or unproven extensions), hand-assembled code, the choice of language or languages used (some are more safe than others), the use of compiler or build procedures or flags (including but not limited to security extensions, bounds protection, heap protection, stack protection, ROP protection, ASLR or randomization flags), library or dependency risk, execution strategy (such as number of threads, concurrency, locality or remoteness), networking or communications strategy (such as shared pages, UNIX sockets, local or remote IP sockets, Bluetooth, Wi-Fi, and their patterns or flags). Some embodiments develop this understanding through source or binary analysis which can be done statically. (For example, determining what sockets a program uses can be determined by inspection: the source makes it obvious, but even with the binary simple static analysis can determine what the flags and preconditions are on the binding and endpoint addresses.) In some embodiments, symbolic analysis is performed. In some embodiments, dynamic analysis is performed: this can be as simple as a coverage measurer hooked to the package publisher's or third-party's or our own generated test/coverage harness, which then partially determines one or more of statistical properties, behaviors, analytic provable properties (such as that the address is always masked to its broadcast address), or an inventory of behaviors. This sort of analysis can generate a powerful understanding of the behaviors and risks that an application may entail. Also, to repeat, some embodiments combine or perform analysis across the multiple binaries that make up an application, such as its dependencies, underlying system state, and package or container. Some embodiments direct further scrutiny to areas of code influenced by reputation, risk, and provenance (such as using a range table specifying the minimum degree of analysis for a given risk level of the contributor or a rollup of the contributor and influencers for a range of code, with degrees being assigned to each analysis method or submethod such as by an expert.)

In some embodiments, a rule rollup 850, such as those specified by a table, defines how the categories weigh in a total score. Some embodiments use a hierarchical longest-match category named patterns, assigned to a per-parent fraction. For example, a category named "linking:known_patterns" might be assigned 20% of the "linking" category; this means that the sum of all "linking:known_patterns:*" except "linking:known_patterns:_" divided by "linking:known_patterns:_" is weighted to 20% of the value of "linking"; furthermore, when a match is made m is added to "linking:known_patterns" and M is added to "linking:known_patterns:_", and n is added to "linking:known_patterns" and N to "linking:known_patterns:_" when a part of the data fully fails to match. Some embodiments track the amount of coverage achieved, and instead can produce a weighting not based on N or M but by default weighted to the fraction of bytes covered per category versus expected, with n normalized on its own after reporting the bytes covered by the rule. Of course, rollups can be more general, as they can produce the synthesis of the individual risk versus coverage metrics.

Risk scores produced do not themselves need to be a direct output of a rollup: they can be any arbitrary function whose inputs can comprise any one or more of—and are not limited to-one or more rollups, individual rules, weightings of the rules, the type of rules, the degree of match of a rule (especially for when the rules engine is fuzzy matching), the composite of the type of rules, manual or automatically learned triggers of combinations of the rules, comparisons to peer applications by any means (including developing a statistical background of how many of a rule or of what distribution of the rule exists across the peer applications, and then using a threshold, continuous risk function, trigger/high-watermark mechanism, or arbitrary function to assess the program in light of its peer statistics).

One added possible advantage about analyzing the source for the binary build itself is that further security, risk, and behavioral constraints can be extracted from the source code than from the binary. Source code analysis such as in FIG. 7 can allow a deeper understanding of what conditions can be placed onto memory or behavior. For example, binary analysis on a C++ compiled program can identify indirect jumps, and by pattern analysis can identify those indirect jumps as virtual table calls, but may not be able to identify constraints on the jumps, thus allowing those instructions to be risk points for wild execution and gateways to jump-oriented programming attacks. However, inspection of the C++ code, or its intermediate or other compiler representations, can provide constraints that can be used to prevent such attacks.

Figure 9:
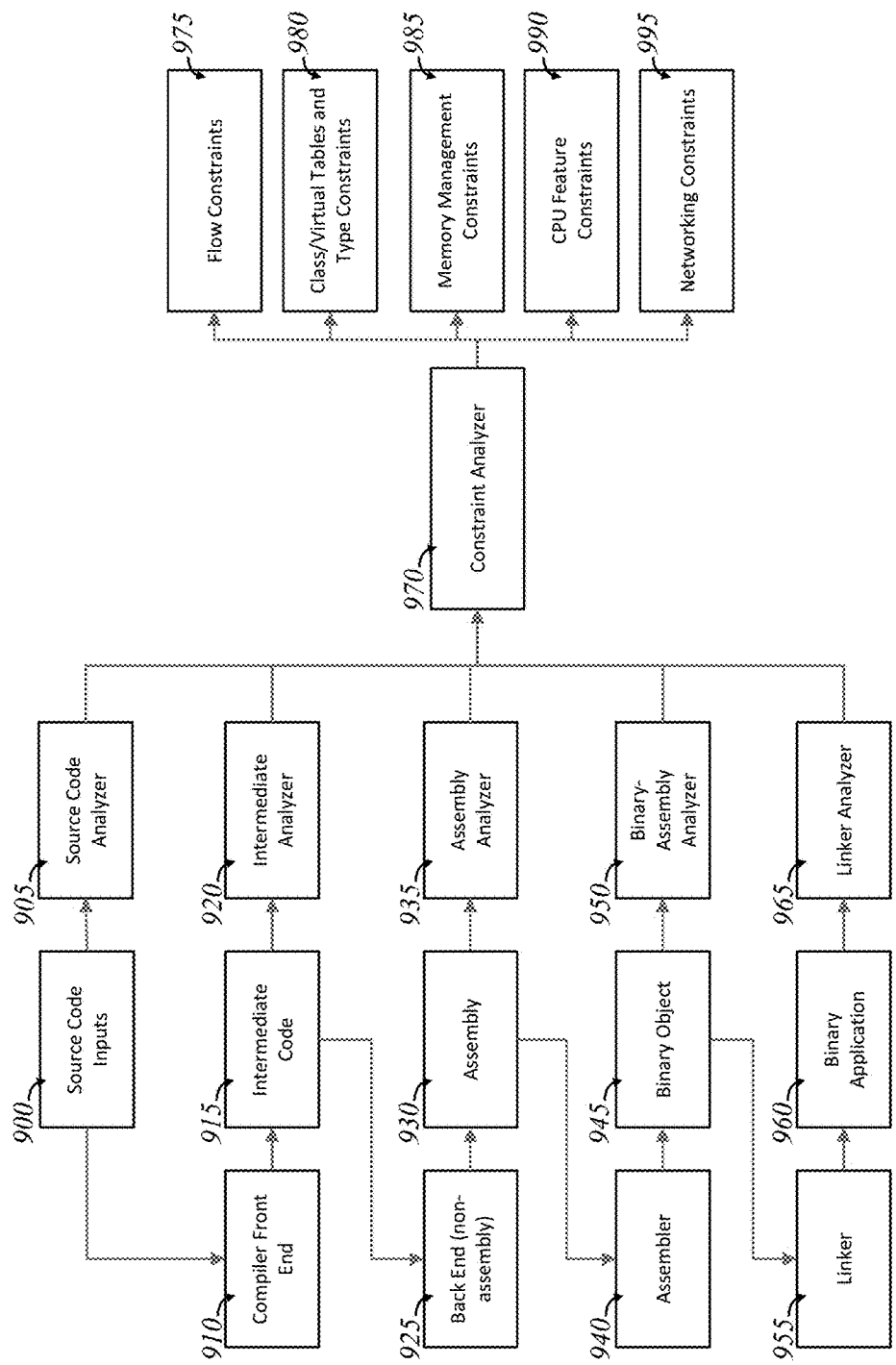
FIG. 9 is a diagram of an embodiment of the invention, showing the analysis of the code generation process for an instance of software producing a set of constraints by a constraint analyzer.

FIG. 9 shows the constraint analysis of some embodiments. A constraint analyzer 970 can take inputs from one or more of the individual step analyzers (such as 905, 920, 935, 950, 965)—and/or from the intermediate outputs themselves (such as 900, 915, 930, 945, and 960, but with arrows not shown on the figure to avoid too many crossing arrows)—to produce constraints that can be applied to or verified against the program or its execution. These now no longer need to be merely risk assessments; the outputs can be used to strengthen the security itself of the underlying process. (As usual, the analyzer need not take inputs from every box figured, nor need it produce every output; these are installation options varying across embodiments.) In some embodiments, the constraint analyzer 970 analyzes the higher level code such as 900, as well as the binary 945 if it needs to, to produce the constraints. A network constraints analyzer in some embodiments analyzes the networking calls and determines the provable and/or likely network behaviors (such as socket types, features used, library or system calls exercised, types of data sent and received), thus producing networking constraints 995. For example, a program that in the field starts copying data between two sockets at 16 kb blocks because of an ROP attack which created that new behavior can be defeated by analysis of the socket patterns used by the source code, which can derive that network writes in that program only occur as short acknowledgements from declared char[256] buffers, and thus a write greater than char[256] is clearly a violation of the conditions. These conditions can be analyzed using type analysis, as well as memory management analysis, which can create rules for behavioral constraints in the field to detect and/or correct for the behavior. CPU feature constraints 990 are produced by some embodiments by measuring the types of and behaviors of unique CPU features. Intel's Software Guard Extensions (SGX) or similar secure enclave behavior introduces unique constraints on the management and operation of the program, and some embodiments check for that and create constraints that reflect the prerequisites and conditions for enclave execution. In some embodiments, memory management constraints 985 are produced; one such way is to analyze the use of mprotect type calls on the background of the standard linker behavior. For example, using a Linux standard C compiler, code is never placed in writable memory. However, simple analysis can show a program asking for an mprotect on its memory space with PROT_WRITE then later PROT_EXEC (for example, the memory address that is getting mprotected is shared between the calls, or at least trace analysis can connect a possibility of the two mprotect calls being on the same memory block from a memory management list). Therefore, a constraint can be added to ensure W xor X, and furthermore that the point of mprotect(PROT_EXEC) can be used as a trigger point for runtime analysis of the type discussed here, if not merely a different protection paradigm for that memory. In some embodiments, libraries or code patterns that can be proven or determined to match within some distance of known safe paradigms trigger a different set of protections or constraints: this allows reusable JIT libraries, for example such as in known linked interpreters, to have their already analyzed and trusted (with or without their unique constraints) to be inserted into the constraints table that the constraint analyzer is using without having to recompute the constraints anew. This can help reduce risk of busy-beaver analysis explosion, as some analysis methods explode combinatorially when multiple complex but individually analyzable pieces come together. (Similar library/code pattern reuse optimizations are available for all analyses discussed here, and are thus also embodiments.) More advanced memory management analysis can specifically perform reachability/trace analysis on as much as all accessed memory, and guided by the language constraints from the source code, can make a more determined analysis than compilers traditionally do (but could have, perhaps) on whether variables in stacks or heap should have different behavioral constraints. Note that a behavioral constraint may be greater than a permission. Variables that control execution flow (such as virtual table pointers) are legitimately written to, but always by the C++/similar object instantiation harness. Static analysis can simply derive that once an object is instantiated, its vtable pointer table should not be overwritten until a matching deallocation to the object occurs. (The language usually doesn't allow for it, but even if it did, such as with JavaScript, static code analysis can determine if such vtable swapping occurs, such as by seeing a vtable write to memory at a distance from its initialization or after a check or assertion that the object is already there and/or of a type.) These can be captured in class and type constraints 980. Such a constraint isn't used today by compilers, since creating harness logic to enforce that rule using CPU/OS protections has an overhead that not all developers anticipate taking. However, as we shall soon see, one advantage of the present invention is that the choice on what security constraints to enforce can now be transferred more into the hands of the user. Class/type constraints are similar, and some embodiments generate them by analyzing the type hierarchy: this can allow for a tighter runtime constraint to be performed. Flow analysis allows for general understanding of the possible execution pathways and the production of flow constraints 975. One embodiment measures the exact instruction alignments: Intel processors, for example, have variable length instructions that have no word alignment requirements. This exposes the program to ROP not just against the instructions the assembler created but against one-off, two-off, etc., refiguring of the instructions (add 1 to the first instruction's address and a whole new set of instructions that were not intended will appear). These alignments can be enforced, either occasionally and well defined points (such as indirect jumps), or through occasional or constant checking of the runtime.

As you can see, the above anticipates a runtime enforcement mechanism for overlaid constraints and enforcements, which will be discussed later. However, there are some additional methods for protection which use compiles, used by some embodiments.

Figure 10:
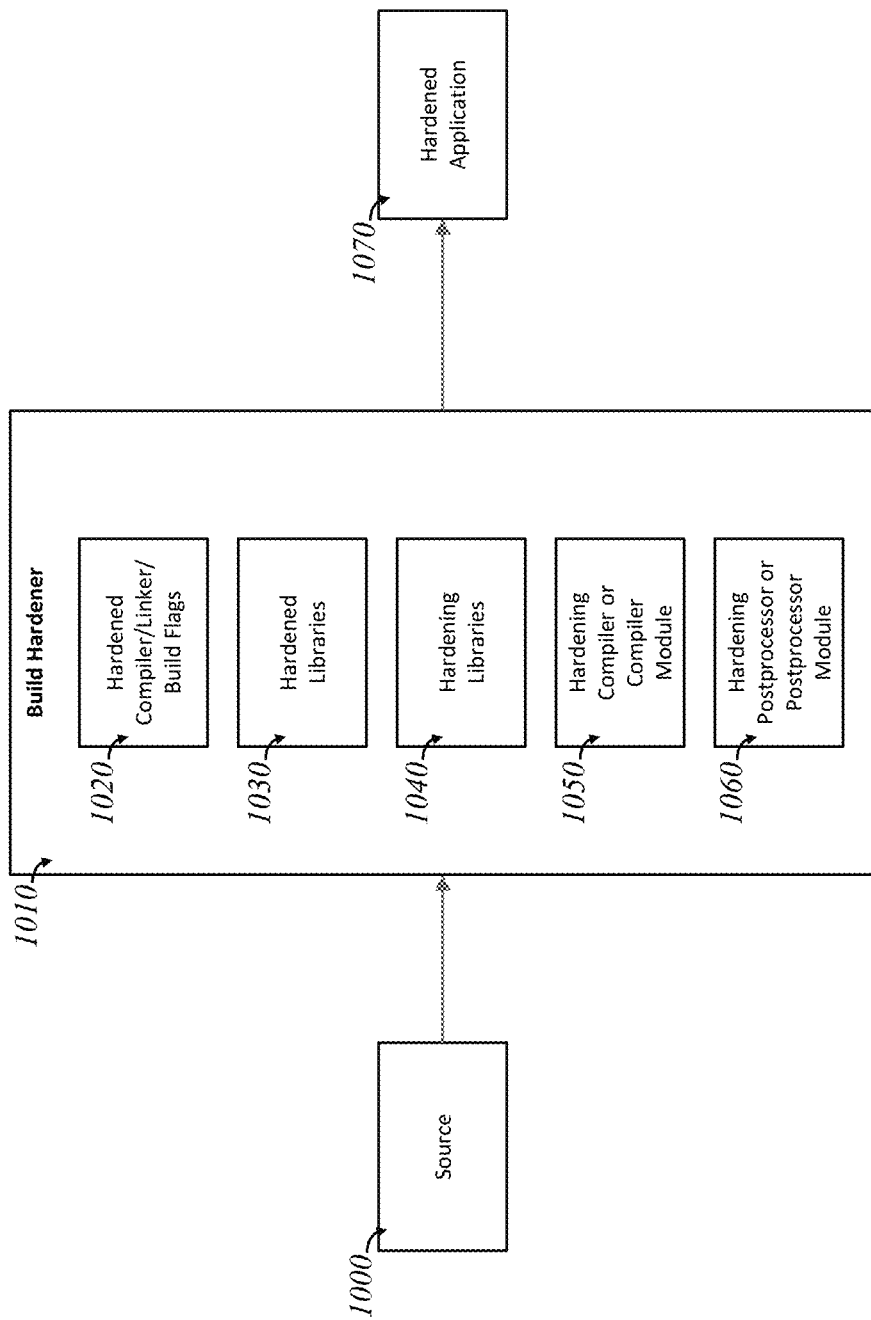
FIG. 10 is a diagram of an embodiment of the invention, showing a hardening build process to produce a hardened binary.

FIG. 10 shows a hardening build process used by some embodiments. Source code 1000 is introduced into a hardening build process 1010. The goal of the hardening build process is to produce a hardened binary 1070 (or binaries and related installation files or settings, or at least a subset, possibly including dependency libraries among other things), meaning one that has been built with stronger security. In some embodiments, the hardening includes using compiler or build system flags and settings 1020 that introduce further protections or checks into the output. In many binary installers, the binaries were built for optimization over protection, or at least more for optimization than a user may desire in a given installation, as protections often incur a nonzero space and/or time overhead than protections. For example, some compilers can emit instructions that perform explicit bounds checks for every array access, but it is possible to tell the build system to avoid that check to add extra performance. This one-size-fits-all model doesn't help, and thus requires every user to take what they are given or be sophisticated in hunting down and choosing installation packages—something that is usually to be avoided in commercial or widely-adopted open source projects. However, using the build process described here, we can produce multiple versions of the hardened output 1070, with different levels of protection and thus different positions on the optimization/protection tradeoff. Some embodiments include substitutions of hardened libraries or modules 1030;

a hardened library or module is one that itself was built with hardening techniques such as bounds checks. Some embodiments include substitutions of hardening libraries or modules 1040; these include but are not limited to hardening memory management or allocation libraries (which keep stricter check of the regions and their pointers, often separating internal memory management state from the allocated regions to ensure that the memory manager itself doesn't become corrupted on an overflow, to even taking into account additional compiler usage information to introduce segregation between different memory types, such as using reachability to determine that a piece of memory is never written to twice to determine that the library should make it read only after the first write), hardening networking libraries (such as those that include access restrictions or authentication and/or encryption such as a transparent SSL socket layer), hardening process allocation libraries, hardening security primitive libraries (such as those that use a secure enclave for key matter and the like, or use security hardware or stronger cyphers), hardening interpreter and JIT libraries, and verification libraries (such as below). Some embodiments use hardening compilers or modules 1050. These include compilers or modules that perform more hardening than the standard compiler, including but not limited to: introducing additional bounds checks, performing reachability and accessibility information to segregate variables or memory that can have different access restrictions (such as moving initialized constants into read-only memory by performing different memory and segment layout than the standard compiler), emitting stricter type checks, emitting stricter indirect function pointer checks, using different virtual table/type dispatch mechanisms that are more secure (such as those that keep function pointers always in read-only memory and do careful vtable ID checks to ensure that the type being used at runtime would always be a feasible type for the code using it—again, these are often known by the compiler and produce compile time errors but are not preserved in the binary once written), employing different code and memory layout strategies; introducing deeper compiler or assembler randomizations (such as randomized instruction set choices, randomized basic block locations, randomized jumps or redirections, randomized memory fragmentation to produce a more even distribution of valid code pointers throughout the large memory space which can help defeat pointer guessing attacks, or other randomized layouts including self-randomizing code or uniquely randomizable code: specifically, one embodiment segments code into many small blocks in unique code segments, and allows the underlying OS ASLR mechanism distribute those many small blocks all through memory, using an internal linking table with relocations that the loader will fill in to connect the blocks; such tables already exist as vtables and thus one further embodiment is to distribute each class's code logic to a different relocatable randomizable segment). These mechanisms may, depending on the type, require access to different compiler state, such as the parse tree or type database. Some embodiments use separate postprocessing using postprocessors or modules 1060, which can occur in between the phases of compilation, optimization, emitting, assembly, and linkage. These post (or really in between as well) processing steps are often a different way of inserting the above compiler/module logic into a multi-phase workstream, differentiated in many cases by the structure of the underlying compiler. Some compilers produce multiple file intermediates, and thus have direct hooking mechanisms for accessing the intermediates; others require modules or compiler source changes to allow access to the right state. (LLVM is more classical and has better insertion points; GCC is more spaghetti and besides GIMPLE it has less options for access without modifying the compiler. That being said, in some embodiments, the compiler is switched from one compiler to another, such as GCC to LLVM where appropriate, and some embodiments use a reconciler to ensure that the output of the switched compiler reconverges with the expected behavior of the first.)

In the above cases, it is not a requirement that the hardening be performed project wide. Some embodiments map the choice of hardening techniques to different regions, different files, different outputs, different modules, or different logical groupings of code, such as based on the needs of the user, the risk of the different parts of the code being hardened, or the difficulty in processing the parts of code.

Figure 11:
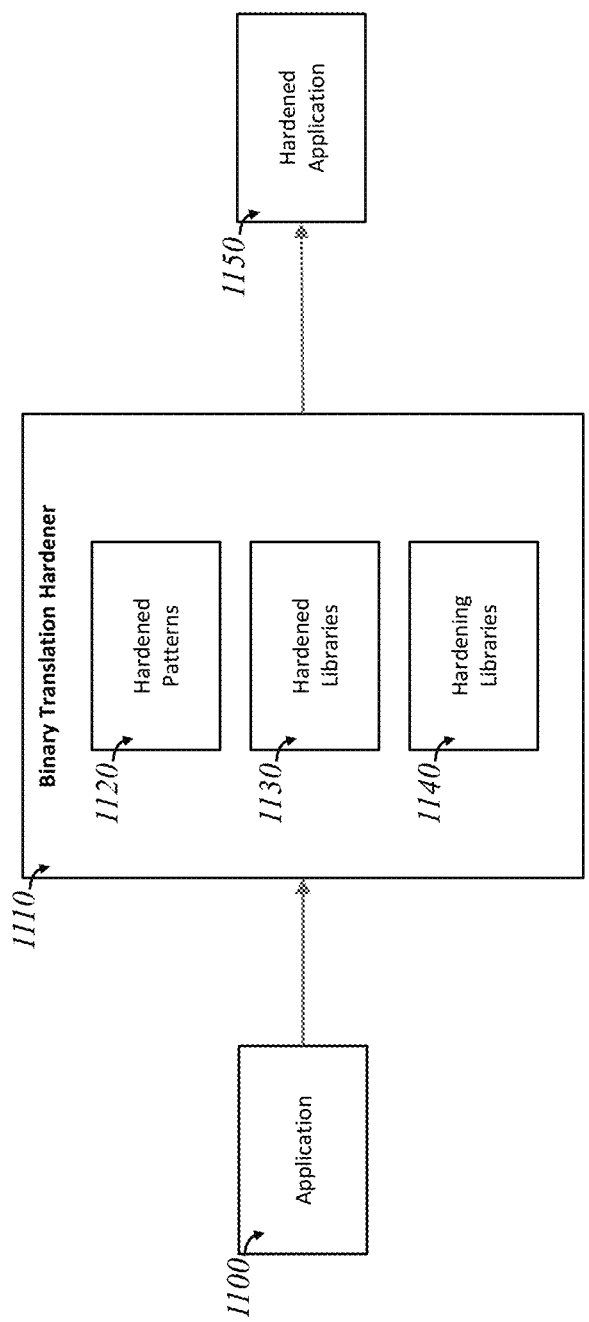
FIG. 11 is a diagram of an embodiment of the invention, showing a hardening binary translation of an image.

The work need not be limited to the source code. As mentioned above in regards to risk and constraint analysis on the binary (such as the contents of FIG. 9), binary translation is performed by some embodiments to enact additional protections. FIG. 11 illustrates a hardening binary translator 1110. A binary (or binaries) 1100 are processed to result in a hardened binary (or binaries, etc.) 1150. At the binary level modules and libraries can be swapped out and replaced with other libraries, such as hardened libraries 1130 or hardening libraries 1140, and their linkages rewritten as needed. For example, some libraries (like memory management) wrap the underlying runtime library (like libc) through dynamic symbol overriding, in which case replacing the library to use requires merely rewriting the dependency segments to include the hardening or hardened library. When the library or module has been statically linked in, usually the linker does not do any inlining, and thus by pattern recognition such as throughhardened patterns 1120 or searching some embodiments detect the locations of the original module's code and perform a substitution and relinkage (simple mechanisms include introducing new code at the end of the segment or in a different segment for the new library and replacing the instructions [the head or all] of each function or landing point of the old library with jumps to the new one). Pattern matching and replacement is an extension of the pattern analysis from above. In these embodiments, when the rule or pattern is matched, a transformation process is associated with the matched rule or pattern that allows the binary to be edited. The editing includes but is not limited to: replacing indirect function calls with calls with protection logic (such as ensuring proper constraint enforcement, as above), introducing additional type checking logic, introducing bounds checking logic, introducing permissions logic, introducing performance or timing logic (such as adding nops and time wasting or time randomization to critical security logic that otherwise leaks information by time taken: one simple method is to introduce random nop loops at random places in the critical logic such that the statistical noise of the nop loops buries the information that was being leaked), reformatting or repatterning code and/or data to preserve or introduce new constraints (such as memory permissions as mentioned above), and adding detection mechanisms for systems, environments, and behaviors (such as adding code to detect that the program is being paused more than appropriate, or is having more cache misses than appropriate, and may be being subject to timing analysis or manipulation). Furthermore, some embodiments couple the constraints-analyzing mechanisms above and the binary editing to avoid having to perform compiler generation modification; these embodiments may be chosen when binary editing is, for example, considered less risky, more performant, or more capable of being distributed between systems than recompilation.

Figure 12:
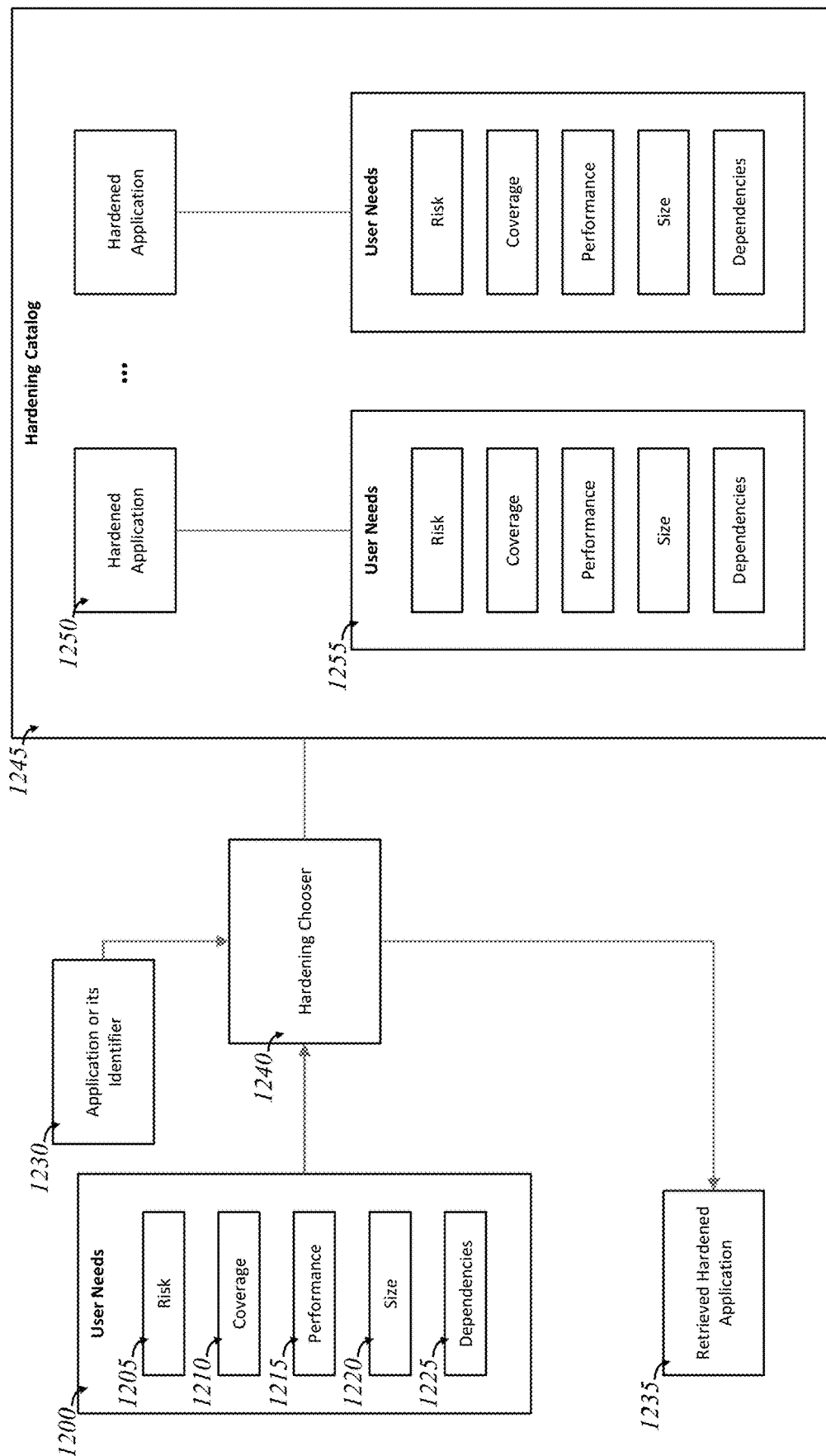
FIG. 12 is a diagram of an embodiment of the invention, showing a hardening catalog and a choice of hardening images from within it based on user needs.

FIG. 12 shows a hardening catalog used by some embodiments. A hardening catalog 1245 contains one or more hardened versions 1250 of the same application (binary or binaries or installation packages or other units of software). Associated with each entry in the catalog the entry's properties such as 1255 possibly mapping to user needs 1200, which may include but are not limited to: risk of the entry 1205, the reputation, the coverage 1210, the performance impacts 1215, the size impacts 1220, the increased protection, the protections associated with the build, the dependencies 1225 of the build, the changes in the dependencies of the build (which may be by a loop entry pointing to the dependencies as entries), the added work or incompleteness that will be resolved later such as at installation, load or runtime, and the degree of substitutability or the impact of substitution (including pulling dependencies and the added ripple of changes) of the binary. A hardening chooser 1240 is presented with the application 1230 (binary or binaries or installation package, etc.) or an identifier identifying it (such as the binary, etc. itself, or a hash of it, or a version string, or a version substring or pattern match of it) along with zero or more needs (or desires or demands) 1200 of the user in its use—such needs can be automatically generated based on an assessed posture requirement for the installation at hand, the specific binary, or the actual stated desires of the user among other things—and finds one or more appropriate matches. In some embodiments, the matches are made available for actual substitution on the running system. In some embodiments, the user is presented with a range (such as a dial or slider) allowing the user to select what degree of hardening and protection is wanted, and that is used to fetch matching binaries. In some embodiments, the user is shown the consequences of each setting, such as updating heatmaps or other graphical representations of system security, risk, reputation, protection, and coverage, to aid in the choice.

Moreover, there is no requirement that all applications (binaries or installations) are of the exact same codebase. Even though some embodiments access the catalog by keying off of the binary, the package, the package name, or other identifier, the results of the catalog can contain different software behaviors. In some embodiments, catalog entries contain bug fixes or vulnerability patches to the software: this would normally result in a nominally different version of the software, but so long as feature compatibility is reasonably maintained, such a difference may not matter. What patches are applied and how can be chosen by administrative preference, risk tolerance such as by the user (for example, critical patches might be applied to some or all entries but noncritical ones might not be), or automated criteria, among other things. In substitution environments, for example, this allows for patches to be dropped directly into the substituted environment.

Figure 13:
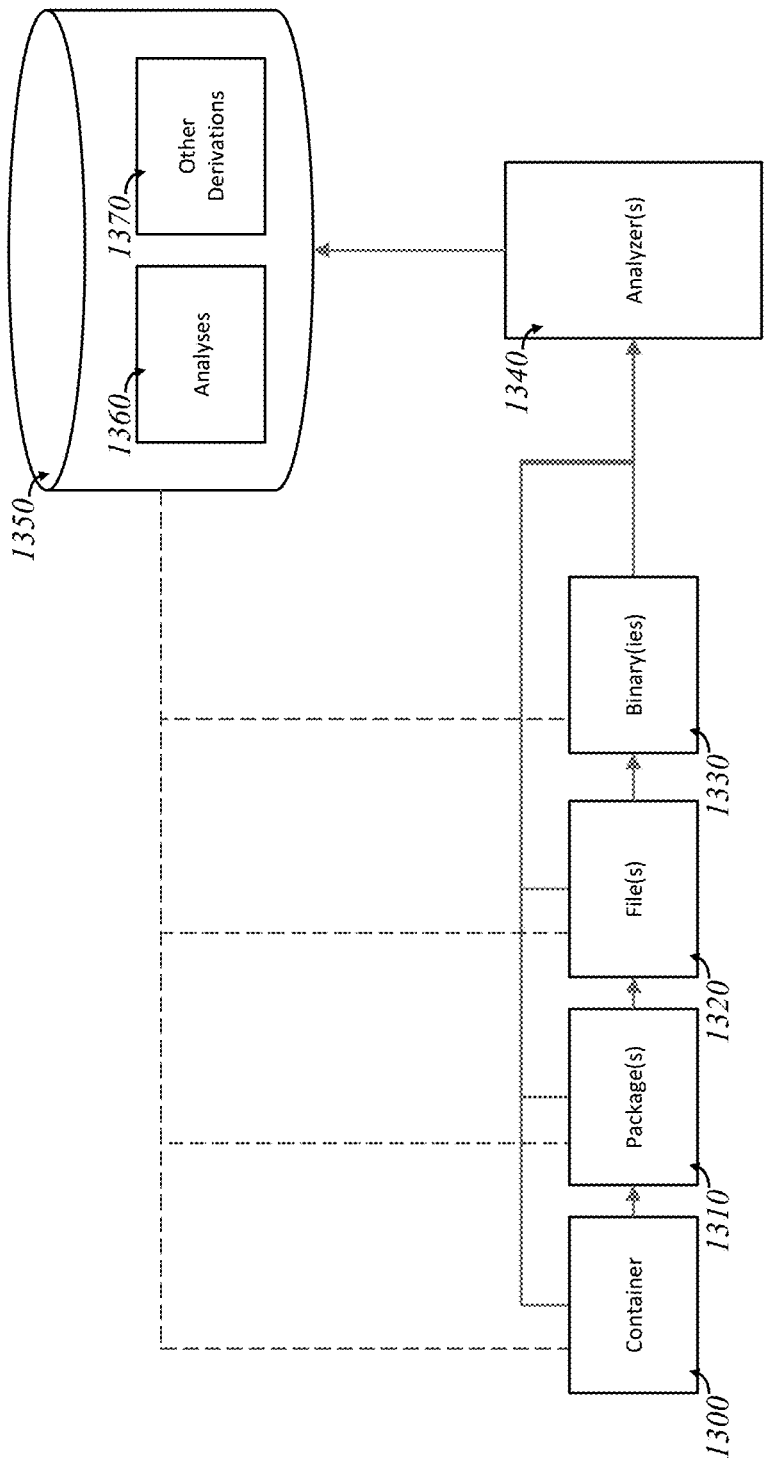
FIG. 13 is a diagram of an embodiment of the invention, showing the analysis of a container.

So far, it's been made clear that the analyses can apply not just to one binary but to the collection of binaries and attendant dependencies that make up an application, a package, a container, or filesystem or VM. Some embodiments work at the level of the container or package, and create databases indexed on those containers or packages, such as in FIG. 13. Some embodiments derive from a container 1300 a package or packages 1310 within. From the package 1310 files 1320 are derived, some of which are binaries 1330. One or more analyzers 1340 work as above on those files, packages, and containers, and their analyses 1360, constraints, metrics, and other derived data 1370 of relevance is contained in a database 1350, which itself is indexed by the containers and/or packages and their subitems (files, etc.). A possible advantage of working at the container level is that integration with application deployment mechanisms, such as Docker or Kubernetes, can be performed easier.

Again, the location of the analyzer is dependent on the embodiment. Some embodiments collocate an analyzer with a verifier, allowing local analysis (such as local binary editing, substitution, measurement, and rollup). Some use a remote analyzer. Some use an offline analyzer. Some use a blend of the above.

The disclosure so far has mentioned a number of different metrics for security and how they can be produced. Reputation is a measure of the trustworthiness (or corruption or corruptibility), and can be applied to among other things the software, to the techniques with which it was built (including development and code writing processes as well as the compilation tools), the people who built it, contributed to it, advertised it, helped it, and so on. (See above for more). Risk can be a part of the reputation metric, or it can be represented separately, identifying—depending on the desired risk metric—intrinsic vulnerability potential of the actual code, or its supply chain, for example. Coverage represents how much of the software, or the supply chain, was analyzed and how much may be unknown still. Value or criticality is a measure of how important the software or its data may be, and may take into account local determinations as well as the determination and metric of the data or applications within. All of these metrics can change over time for the exact same instance of software, as more knowledge is gained.

These metrics can all be, and often do start out as, fine grained for individual analysis "atoms" (which can be provenance elements, installation atoms, code elements, risk elements, and so on). There is value in rolling up these items into metrics representing assemblies of these parts. A rollup scheme was already disclosed for some embodiments representing risk within a binary or installation. The same types of procedures can be employed to create rollups or summaries for assemblies of installations, of binaries, of machines, of networks, and of entire deployments. Some embodiments use rules-based or function-based mechanisms—such as what was disclosed for a binary—to produce rollups for these assemblages. Some embodiments—especially those focused on metrics that can be expressed as likelihoods or probabilities—use a Bayesian network to express the total likelihoods, risks, or reputations of an assembly. Risk that an actor is bad, for example, can be expressed as global probability that the actor is bad: this can be a Bayesian probability assessing our knowledge about the badness of the actor, or it can be a frequentist probability that an inconsistent actor (most are) introduces vulnerabilities, or it can be a mixture of both or something else. Some embodiments derive probability or likelihood values from past history—such as making a frequency measure of vulnerabilities associated with contributors or their associations—to produce a frequentist metric. Some embodiments capture the degree of belief, such as based on intelligence reports or expert assessments: for example, a number can be assigned to a country or its political or military arms based on theoretical assessment. These numbers may not be absolute: one possible advantage of embodiments that encode these as likelihoods (or distributions or +/−likelihoods) is that the base rate of incidence may not need to be known to understand the network effects of the conglomeration of the parts in the joint metrics. In base-rate-free metrical analyses and rollups, some embodiments provide the user with a mooted base rate for point of explanation, such as on a slider from 0 to 1 to explore the base rate risks. Some embodiments ask the user an inventory of questions, be they static or dynamic (as in based on available data as well as based on previous answers), such as "How likely do you feel your systems are to being an attractive and high value target of an attack", to help determine the network of possible base rates. These inference networks are constructed from the available data, in some embodiments using discrete likelihoods/probabilities and in others using discrete or continuous distributions. For example, the entire supply chain can be evaluated from specific items to produce a likelihood or probability impugning each particular application of a system.

Figure 14:
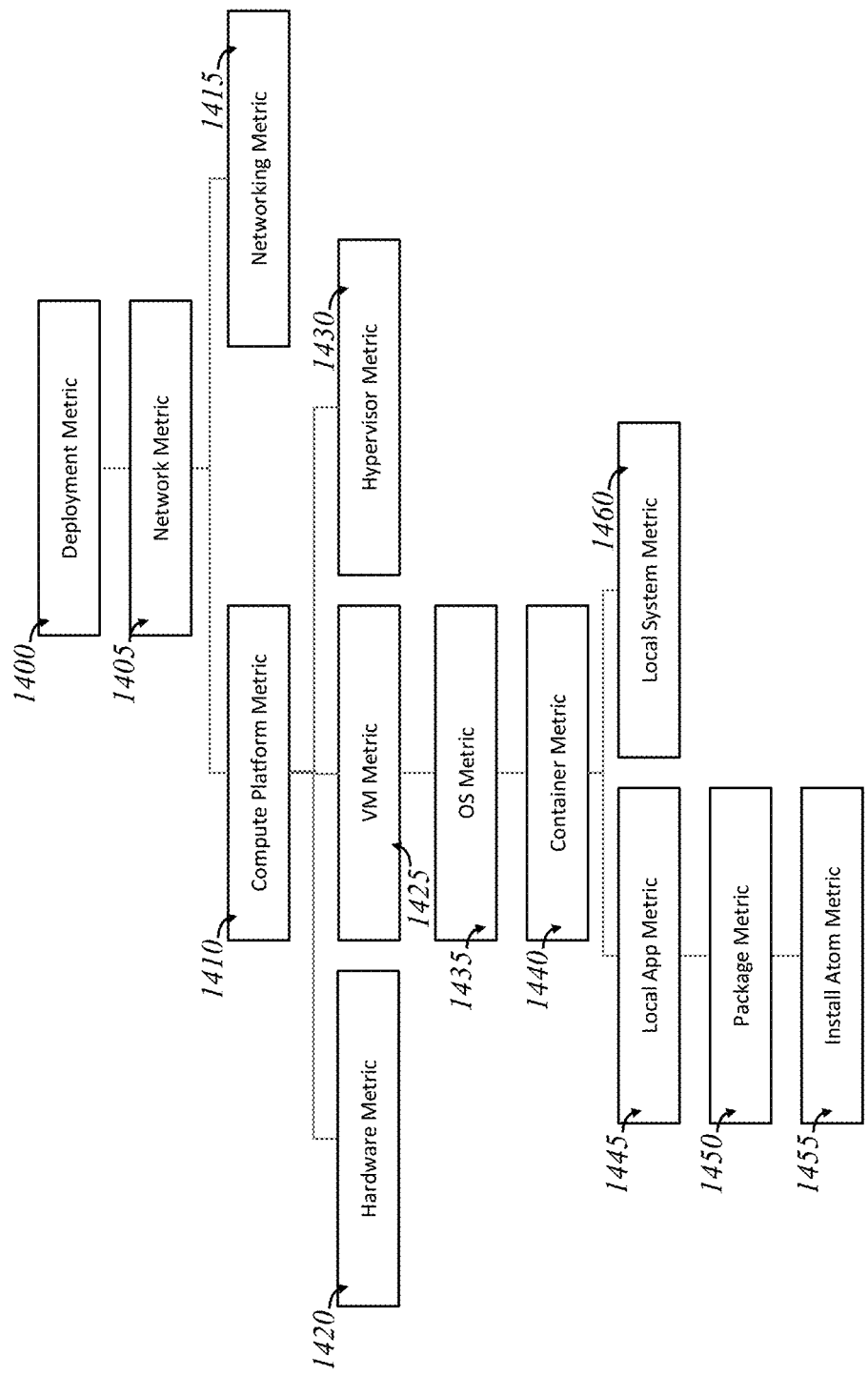
FIG. 14 is a diagram of an embodiment of the invention, showing a hierarchy of metrics.

Some embodiments create from the assemblage a hierarchical rollup of metrics (be they risk, reputation, coverage, and so on). Some embodiments employ hierarchies such as shown in FIG. 14. Parts available for the metric from the figure are described below, understanding that most relationships are many from below to one above. An install atom metric 1455 is a metric for each install atom (such as file, setting change, registry entry, and so on). A package metric 1450 is for an install or deployment package. An application locally (to distinguish from a distributed application which is made of many local apps) may be made of multiple install packages—usually a head one and its dependencies—and may have a metric 1445. A local system metric 1460 measures the software system around and underneath the applications. A container metric 1440, if it exists, represents the deployable software for a package, such as a Docker container. An OS metric 1435 measures the overall OS, including any containers running on it as well as the kernel. A VM metric 1425 measures the OS and any other parts inside a hypervisor instance, if present; a hypervisor metric 1430 measures the hypervisor. Hardware itself is represented by a hardware metric 1420, and together a compute platform metric 1410 can be produced. The network and its resources (routers, switches, firewalls, sniffers, etc.) belong in a networking metric 1415. Together compute metrics 1410 and the networking metrics 1415 are joined into a network wide metric 1405. And different networks can be connected to a deployment metric 1400. (As usual, this list is not exhaustive: other intervening parts that are not listed can be added, and each metric can be singular or multiple.) Different embodiments avail themselves of different methods of producing the inter-level connections. Some embodiments use a straight average of each child. Some use a coverage-weighted average (normalized against coverage of the metric across the measured or represented as its components, such as what is described previously) to produce the next level metric. Some use policy-based weightings. Some use general formulations, such as rule matching, utility weighting, metric-based weighting, or script-based or coded procedural calculations. Metrics need not be kept entirely separate within hierarchies. In some embodiments, metrics are mixed to form summary or conflated metrics. In some embodiments, metric-based weighting allows cross-metric mixing: for example, some embodiments produce a reputation hierarchy by mixing the risk, coverage, and raw reputation scores of its children using mixing techniques as described above. In some embodiments, the hierarchy itself is presented in a report for the user to see and read through; in some embodiments, it is presented as a navigable form that allows deep diving and drilldowns into the component parts and the logic/mixing/rollup procedures for each level. In some further embodiments, the navigation allows for mooting, or changing parts of the predictive calculations, rollups, and assumptions as needed, and to see the changes propagate.

Figure 15:
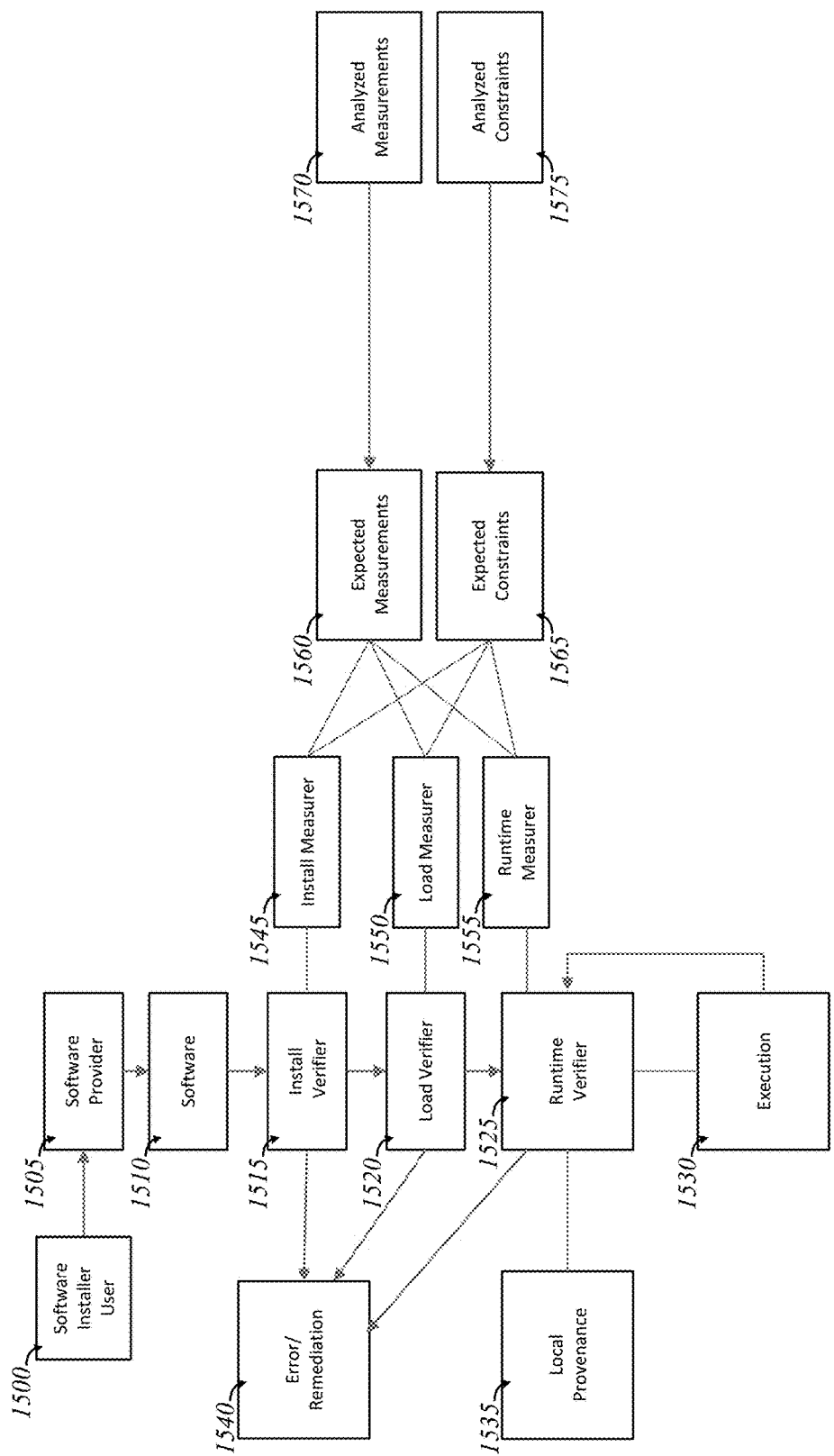
FIG. 15 is a diagram of an embodiment of the invention, showing the runtime application of measurements and constraints into a loaded application.

FIG. 15 shows runtime verification in some embodiments. A software installer user 1500 installs software 1510 procured from a software provider 1505. This may occur within the flow of establishing security analysis (above), or it may happen out of band and be matched up later. In some embodiments, the software 1510, during or after installation, is checked upon by an install verifier 1515, which has an install measurer 1545 (integrated or external to it) produce an install-based measurement. This is checked with an expected install measurement contained in 1560 (which may be the same as other measurements or different because of the phase), itself procured from an analyzer which produces the measurement via 1570. The analyzer measurer, of course, may be as simple as the install measurer (and may be the install measurer), or it may be as complex as that listed in the first major section of this disclosure. If the verification fails, or needs further assistance, or has information to display to the user, or requests a partial or full remediation, the verifier can pause or halt execution and/or take other action through an error/remediation subsystem 1540. Some further embodiments hook the installer (such as through apt or dpkg) to gain this access, using standard means. Some embodiments perform load verification. A load verifier 1520 has a load measurer 1550 measure a loading binary 1510—some embodiments measure the disk image, some measure the in-memory image, and some perform a combination of the two—and compares the measurements to the expected, as above. Some further embodiments hook the loader (such as through replacing the loader, wrapping the loader, adding a dynamic library that will perform the verification into the load process, setting breakpoints or interrupts and using an interrupt handler as appropriate, and so on) to perform this verification; some hook the standard libraries and the typical program starting point (main, or start even). Some embodiments perform runtime verification, where as the program executes its execution is monitored by a verifier 1525 and measurements (piecemeal or entire, just as with the others) are taken by a runtime measurer 1555, and the measurements compared to the expectations. Some further embodiments hook execution by introducing occasional calls to the verifier in the code (such as at critical junctures such as module initiation or first pass execution), some create timers or other trigger mechanisms that inspect the code when triggered, some hook the execution through CPU registration, some use page table mechanisms to get first-pass hooks, some modify a hypervisor or supervisor or OS. Some embodiments perform constraint verification (or enforcement). In those embodiments, the constraints 1565, such as those produced in analysis via 1575, are made available to the verifier(s), which not only measures the code but validates the proper presence of the constraints; some produce calls to error/remediation 1540 if a constraint does not match. As mentioned before, some embodiments generate constraints by pattern or rule matching; in some embodiments, these constraints themselves are encoded with patterns or rule matching for verification. (For example, a complex constraint to detect that identifies a region of memory as a vtable may have a far simpler invariant constraint which merely validates that things are as they ought to be from analysis: by analogy, a hash of a file is practically just as strong an invariant on the file as the file itself, and yet the file is far more complex.) Some embodiments perform these constraints by modifying the runtime environment (such as creating breakpoints or interrupt calls along the execution pathway, or hooking the operating systems, libraries, subsystems, or indirect function call tables) to enforce the constraints. Some embodiments perform the analysis alongside the verification. This may be desirable for constraint production, for example, as many of the analyses for code patterns can be produced during installation, loading, or even runtime execution if they are performant enough, based on the choice of the administrator.

Figure 16:
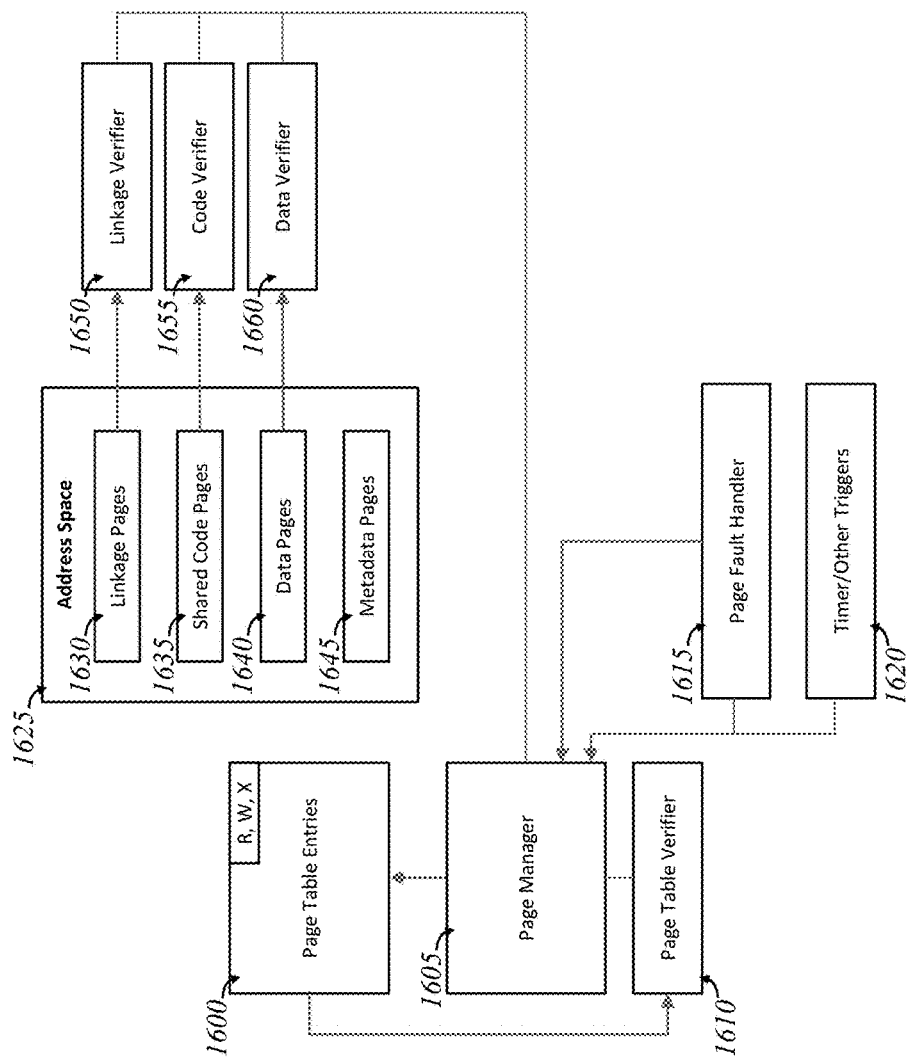
FIG. 16 is a diagram of an embodiment of the invention, showing a page manager interacting with a set of verifiers in a running application.

FIG. 16 shows page verification in some embodiments. A page manager 1605 establishes page table (or region table) entries 1600 for the running program or system. These page table entries (which may be flat or hierarchical) have permissions for the page including read, write, and execute. An optional page table verifier 1610 verifies that the page tables 1660 match the intent of the page manager 1605. When a page fault or other trigger occurs, the page manager 1605 is invoked, to determine how to resolve the situation. The page manager itself derives its state from, at least in part, the pages. Linkage pages 1630, shared code pages 1635, and/or data pages 1640 proceed through one or more of the verifiers (linkage 1650, code 1655, data 1660), to determine whether the pages are valid. In some embodiments, the code verifier 1635 verifies the code on first execute: for example, code pages are set as non-X, and the first execution of the page invokes the code verifier, which verifies one or more pages and converts them to X. In some embodiments, the pages are also ensured to be non-W upon conversion, thus ensuring that a page is neither writable nor executable in actuality. A write to the page will trigger the page manager, which can dispatch the write as appropriate: in some embodiments, the write will trigger the page to become non-X, repeating the cycle. In some embodiments, the data and data-side linkage verifiers verify the pages on first access: the pages are marked non accessible, and the read (or write if appropriate) fault will invoke the verification and the establishment of the proper privileges. In some embodiments, the layout of memory written by certain pieces of code is verified by the execution of those pieces of code (such as by reverting to non-X for that code, or creating an interrupt or debug trap and modifying the code and thus capturing the execution at the proper point to run the attendant verifiers, or by setting debug breakpoints through hardware).

In some embodiments, the page manager is the operating system (kernel) page manager, with hooks added to access the verifier. More specifically, in some embodiments the kernel is modified to allow a program or security supervisor to register page management hooks. In some of those and some other embodiments, the page manager maintains a shadow page table for representing the state that the underlying page manager wishes to see, separate from the real pages. In some embodiments, the page manager is a proper overlay page manager, intercepting page management and fully maintaining shadow pages. In some embodiments, the page manager uses a separate hardware page table scheme: some further embodiments activate the hardware hypervisor page tables and allow the OS page manager to not be modified. Some further embodiments do not use virtualization for any other purpose, and merely register the verifiers in a rump hypervisor dropped in for purely this purpose. These sorts of rump hypervisors can be loaded as kernel modules or as a part of the kernel itself, and slip below the kernel in the CPU execution stack by virtue of the creation of the mechanism. (KVM, a full hypervisor on Linux, classically starts as a rump hypervisor declaring the kernel to be the root domain, before losing its rumpness by exposing full virtualization support to the user.) In some embodiments, the rump hypervisor claims the root virtualization domain, and forces the operating system that loaded it into a child domain. In some embodiments, the page manager is integrated into the root hypervisor of a full virtualization system (such as Xen or KVM). One possible advantage of the embodiments which use the rump virtualization, and the ones that use the shadow tables, is that they can retain the modularity and behavior expected of the underlying system while allowing for the extra page interceptions needed for verification in those embodiments. Moreover, virtualization is no longer as popular a strategy for software deployments, as system administrators and developers have moved to containerization as a far lighter-weight same-system technique to separate workloads and avoid workload interference: depending on the environment, this can either free up the hypervisor CPU support for security purposes, or suggest not to use hardware virtualization support and rely on software hooks. Therefore, in some embodiments, the page manager runs underneath or in concert with a container-enabled kernel (such as some of the ones which support Docker implementations). In some embodiments, the container or its metadata contains the references for the verifier to properly identify the material needed to perform the verification; in some embodiments, the material is retrieved from a local or remote repository or service as appropriate for the container in use. In some embodiments, the container itself has a verifier (in addition to that of the underlying kernel infrastructure, or separately depending on the type of verifier in use—some embodiments of page runtime verification require kernel support). In some embodiments, the container verifier and the system verifier communicate: in some embodiments, the system verifier verifies the container verifier; in some embodiments, the system verifier verifies the entire container on behalf of the container verifier, such as when the container verifier asks the system verifier to perform that work and provides the material or references sufficient for the system verifier to access the material; in some embodiments, the container verifier does the bulk of the work but asks the system verifier (or a smaller system driver that does not itself perform verification) to instrument the system as needed. For example, in a container environment where the system kernel possesses container-accessible hooks for page table manipulation, the system itself may not need to have a verifier and the container verifier will perform its verification as if it had direct access by using those hooks.

Figure 17:
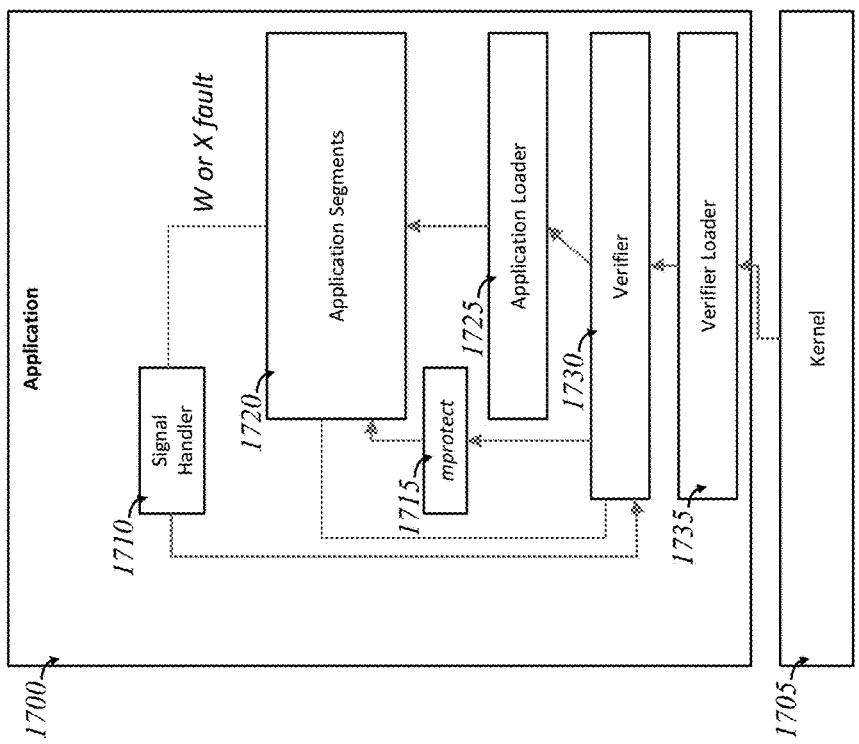
FIG. 17 is a diagram of an embodiment of the invention, showing an injected verifier in a running process.

Some embodiments use mmap/mprotect and the signal handling processes within an application to perform its verification without requiring unique kernel registration procedures, such as in FIG. 17. In some embodiments a verifier 1730 operates as the first entry point in the application: in some embodiments is produced by wrapping ldd with a special verifier loader 1735; in some embodiments this is produced by changing the application's registered loader to the verifier loader 1735; in some embodiments this is produced by loading the process through a statically-loadable process that is the verifier loader. Once the verifier itself is loaded, it instruments the loading to prevent any segment from being loaded as executable: in some embodiments, this is performed by replacing all mmap/mprotect calls in loaded segments with trampolines, diversions, jumps, interrupts, or signal calls to return control to the verifier's page manager to perform the appropriate verification operation; in some embodiments, this is performed by modifying the basic language library (like libc) to perform the control transfer for segment permissions. The page manger in many embodiments in these environments is really a region or segment manager, because it uses the kernel's region-based memory calls like mprotect rather than maintaining a CPU page table that it cannot directly employ. After the application process is loaded, execution occurs. In some embodiments performing runtime execution, upon first execution of the target program segments, it takes the signal for the page fault via handler 1710, performs its verification, and uses mprotect 1715 to remap the verified pages or regions to be executable/non-writable, without regard to the underlying loader's attempts to create different permissions. In some embodiments, the verification occurs entirely at load of executable segments, where the verifier ensures that the segment does not finish loading without verification.

Figure 18:
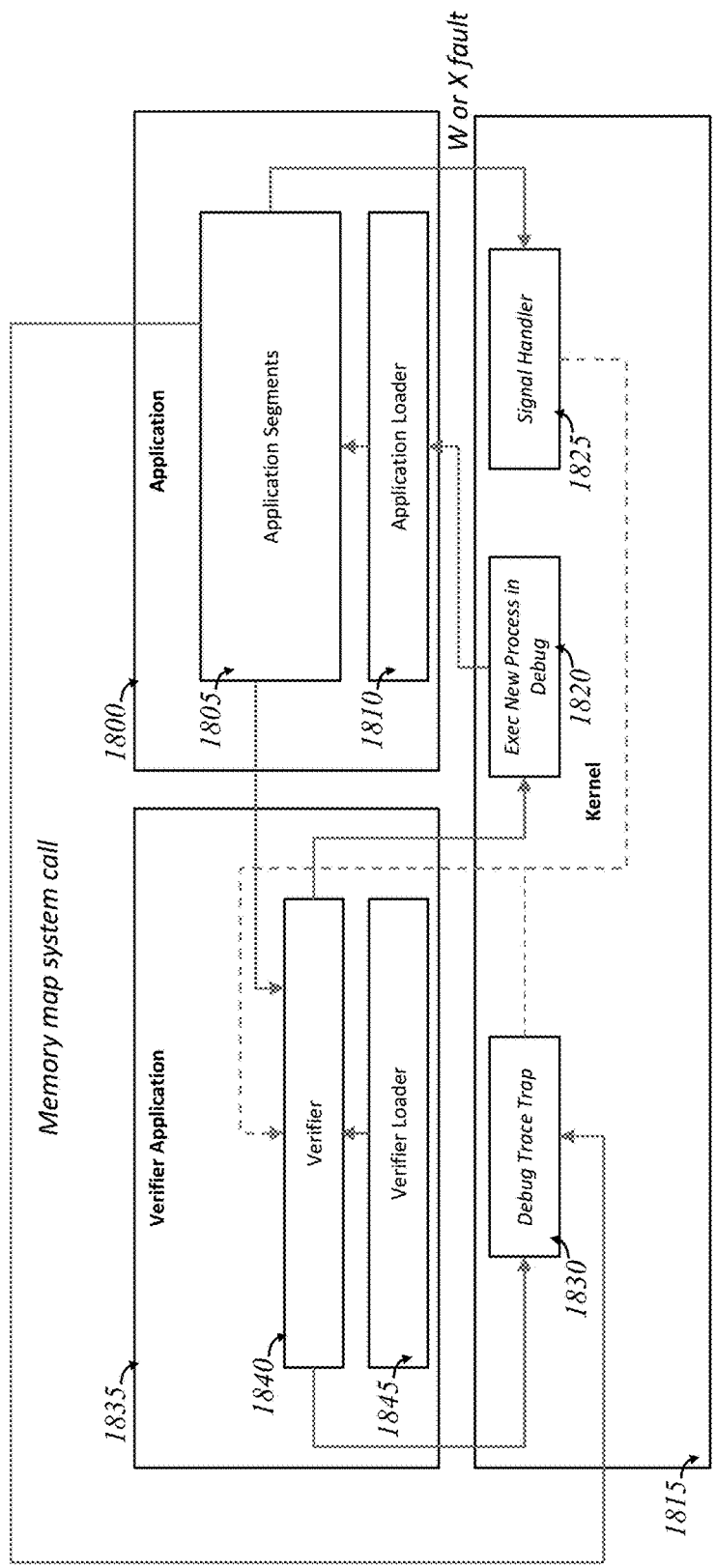
FIG. 18 is a diagram of an embodiment of the invention, showing an external verifier application monitoring a running process.

Some embodiments perform external application verification, such as shown in FIG. 18. In some embodiments, a verifier 1840 is in an external application 1835 that attaches to the application in question 1800, such as using the debugger interfaces (such as 1820 and 1830) of the native kernel and performs its verification by mapping in the application process and setting kernel intercepts for mmap/mprotect and similar to ensure that the verifier's behavior is correct. In some embodiments, the verifier application is loaded first (such as using the techniques above for the in-app verification), but a new process is forked off using system calls such as 1820 to ensure that the verifier application has debug permissions on the application in question: in some embodiments, the verifier forks itself, then calls ptrace to register that it is to be traced, then execs the target application; in others, it attaches to the application to be verified, even after it has already loaded (load verification may be performed after load in many cases). In some embodiments, the verifier application is ran at higher privileges; in some embodiments, it drops those privileges once attached. The verifier then requests to receive permission fault signals from the kernel in some embodiments. In some embodiments, the verifier requests to receive specific system call traps, such as mprotect/mmap (such as by using ptrace (PTRACE_SYSCALL) or specific interfaces for specific syscalls). In some embodiments, the target application is paused and all trapped system calls are replaced with signal-generating instructions (such as inti) or marked with kernel breakpoints. In some embodiments, the target's address space is mapped into the verifier (such as by mapping in the target's/proc/*/mem); in some embodiments, the verifier uses kernel access instructions to peek into (and poke as needed) the target. In some embodiments, for runtime verification the application intercepts requests to create executable memory and passes that to the verifier (such as its page manger, as before engaging in mprotect regions than strict page tables) to ensure that regions or pages are verified before execution. The page manager can then request through the kernel to alter the actual memory permissions of the pages (such as injecting the system call into the process in the manner of a debugger).

Figure 19:
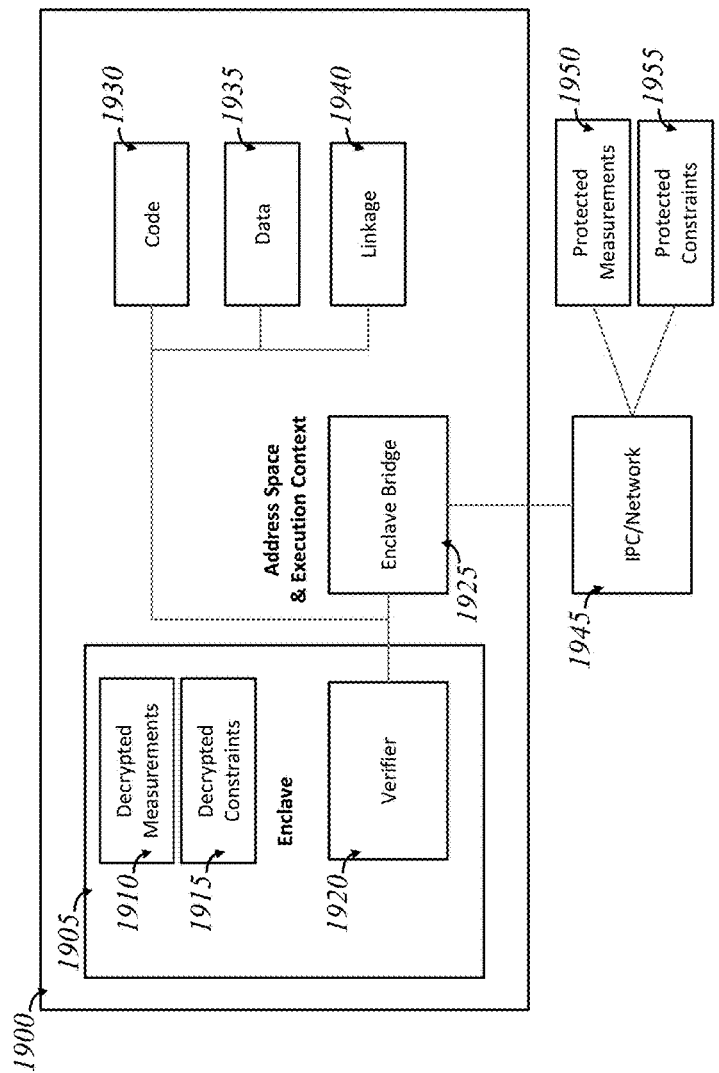
FIG. 19 is a diagram of an embodiment of the invention, showing an embedded secure enclave verifier injected into a running process.

Some embodiments perform supervision in a secure enclave, such as shown in FIG. 19. Most secure enclaves provide complete access to the memory state of the software 1900 from an enclave 1905, but encrypt (or hide) and automatically protect the enclave from any access by the containing software. These types of enclaves, then, can only be entered from specific, well defined entry points, and after that the enclave enforcement ensures that the state of the execution within the enclave is known. Some enclaves are in software—a superior supervisor or hypervisor enforces the logic of the enclave—and some are in hardware, thus freeing up the superior supervision modes for other purposes and anchoring directly into a hardware root of trust. A verifier 1920 in the enclave needs its measurements 1910 and/or constraints 1915, which it needs to be provided. In some embodiments, the measurements/constraints 1950 and 1955 are protected by being encrypted; in some embodiments, the measurements/constraints are protected by being signed. The measurements/constraints are verified for their validity and lack of being tampered with once in the enclave. Some embodiments do this by using the root of trust provided to the enclave (such as through hardware) to use unique key material available to enclave to verify (by signature checking or decryption, for example) the integrity of the provided measurement/constraint material. This allows the material to then be laid down in the protected enclave memory where it cannot be modified from without. In some embodiments, the enclave is injected or activated in userspace for a program: some embodiments introduce this enclave through the process setup mechanisms such as loader/linker interception, introducing an additional library, or modifying the behavior of the kernel. One possible advantage of leaving the verifier in the application is that the full OS separation of privileges between applications remains intact; as well, the verifier is subject to the OS's policing on resources, and accounting remains assigned. Some embodiments introduce the enclave into the kernel itself, where the kernel itself can be protected, and optionally one or more processes can be verified, where the verifier holds multiple contexts to represent which part of memory and which sub-execution-context it is verifying. In cases where the enclave is forbidden from accessing needed resources, an enclave bridge 1925 is introduced, which can bridge those resource requests. In some embodiments, the validator always validates the bridge before returning execution to it; in some embodiments, the bridge is marked non-writable as well; in some embodiments, the bridge is outside of the execution context and the superior supervisor catches the egress attempt from the enclave and satisfies it rather than marking an error. For example, some embodiments use interrupt trampolines, anchored at the error interrupt for enclave egress, allowing other service routines to be executed; conversely, some embodiments catch other interrupts and triggers which the enclave wishes to serve and injects them through the appropriate entry point into the enclave.

Figure 20:
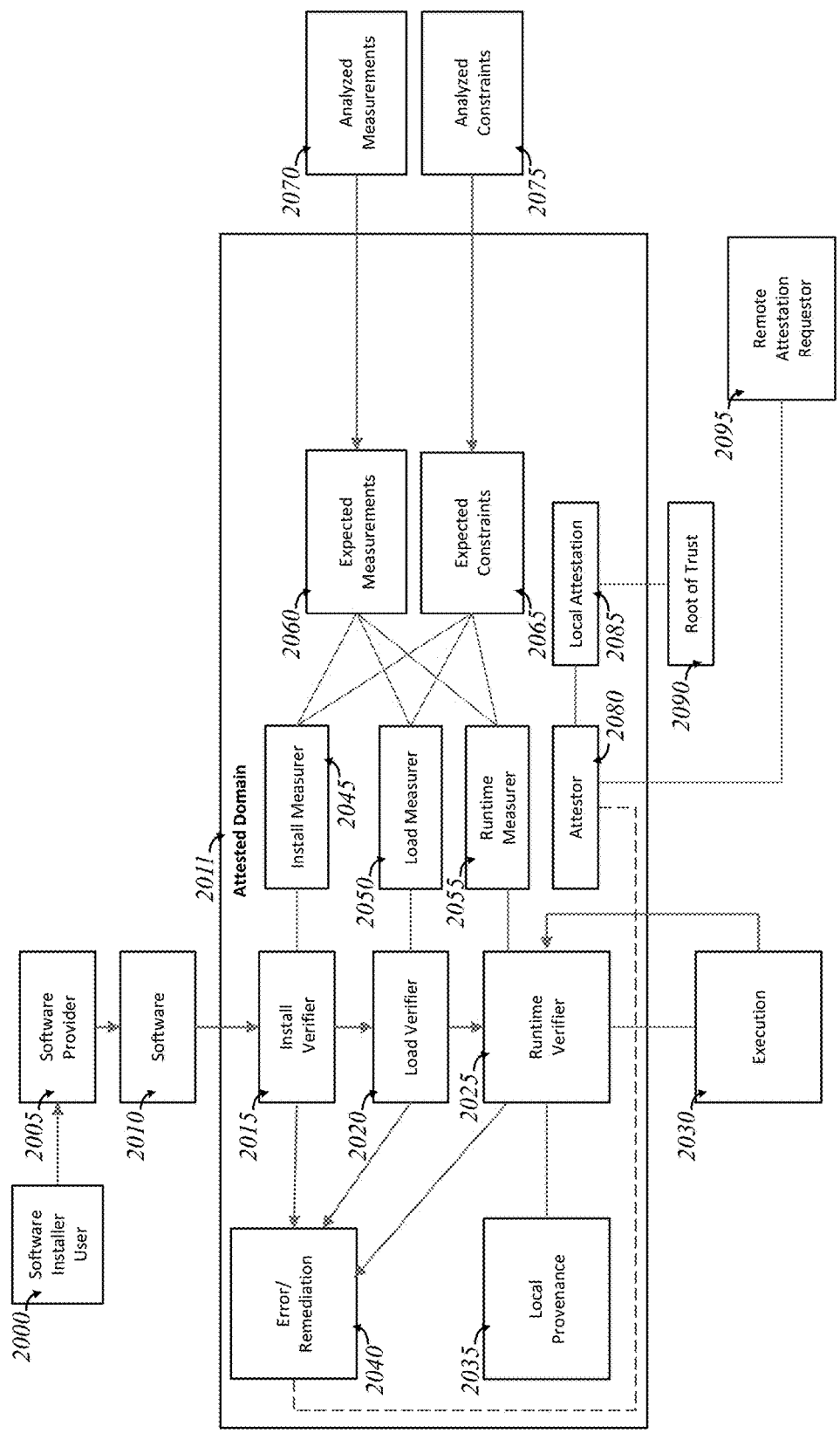
FIG. 20 is a diagram of an embodiment of the invention, showing the runtime application of measurements and constraints in a running application within an attestation domain.

Some embodiments carry the root of trust further and provide for attestation of the verification of the system. FIG. 20 shows the attestation mechanism of some embodiments. A remote attestation requestor 2095 wants to inquire about the integrity and attestation of the local system 2011. Traditionally, this request is sent to unprotected but attested-to software, which then queries the root attestation engine—usually through hardware requests—to produce an attestation measurement, sign it in the chain of trust to prevent modification in the unprotected channels and execution environments, then pass it back to the unprotected environment to send to the requestor. The only attack the unprotected execution domain has is to deny service, if the attestation engine is operating correctly. However, as mentioned in the beginning, the measurements are rudimentary snapshots and do not contain sufficient ongoing protection assurances. Instead, in some embodiments the requestor 2095 asks for the attestation, and either directly or through possibly insecure intermediaries the request lands at the attestor 2080 in the attestation domain 2011 for verification. The verifier attestation domain is a far smaller trusted computing base than the entire system at large, and so a measurement of it (labeled here local attestation 2085) can be captured as before from the root of trust 2090. But furthermore, the verification state (such as coverage, errors detected, remediation state, logs, or other relevant data such as in error/remediation 2040) can be captured and requested to be bound to the local attestation (including in some embodiments being signed by hardware keys; in some by software keys only allowed to the verifier attestation domain), so that the remote attestation requestor has a complete view of the verification status of the applications or system (depending on the request), and thus can make truly informed decisions about communicating with the system or application in question. Without this broader step, it is hard to conceive of the value of an attestation of a system, except for very small functionality systems where complexity is low and vulnerability is unlikely.

In some embodiments, the hardware itself checks for, expects, or demands that a verifier be in place. The hardware root of trust, before turning execution over to the software at the execution point, measures and ensures that the verifier is present and matches the integrity demands it has for the verifier (or verifiers). In some embodiments, the verifier writes into hardware a list of verification certifications, in some cases containing the coverage, results, and provenance or chain of certifications of the material used for verification (or constraining or substitution); some further embodiments use that for execution decisions, and some embodiments provide additional attestation services assuring the recipient that the system has the verifiers in place. Some embodiments have the hardware enforcing the verifier's operation (such as locking down the verifier's memory, like in an enclave). In some embodiments, the hardware and the verifier or verifiers have handshakes they perform, such as to ensure that the verifier is operating properly and has verified the system as appropriate and that the verifier can determine that it is on the appropriate hardware.

In some embodiments, the verifiers are not pure software but themselves have some of the verification performed in hardware. Some embodiments allow the CPU, MMU, or on-bus security module to be entered with specific integrity demands for certain memory regions. This can allow for greater performance, as for example page verification on first execution can occur much quicker as the memory is transitioned across the bus into the CPU cache, or within the CPU cache by an on-chip verifier, than for software to have to populate the first level cache lines with the memory being verified at once, thus not only robbing the CPU of instruction time for other purposes but also possibly creating cache churn or thrashing. In some embodiments, the integrity demands are registered with physical, logical, or virtual addresses or page addresses and either implicit or explicit bounds (such as a second address or count of bytes, instructions, or pages), along with the expected measurement. Some further embodiments represent the measurement by a cryptographic or secure hash; some include a bitmask (linear or compressed) of bits that are to be masked to a known state (such as 0) and thus disregarded in the calculation of the hash. Some embodiments take permissions for regions of memory, and enforce those permissions: an MMU, for example, can execute explicit permissions for regions in many cases, and this is used in some embodiments to handle memory segmentation. Some perform constraint verification instead, using a hardware constraint database, such as one containing memory locations and the logic to execute. Some embodiments snoop the bus and cancel any transactions that are in violation of the integrity or constraint demands, or roll back the transactions. Some embodiments perform this snooping by using a dedicated CPU core on chip, or a separate CPU on bus or somewhere in the cache hierarchy. In some embodiments, the hardware enforcement is limited to a software verifier, which then verifies memory. In some embodiments, an MMU (such as an IOMMU that has switchable domains tagged to the CPU execution domain) is used to divide off verifier memory.

Figure 21:
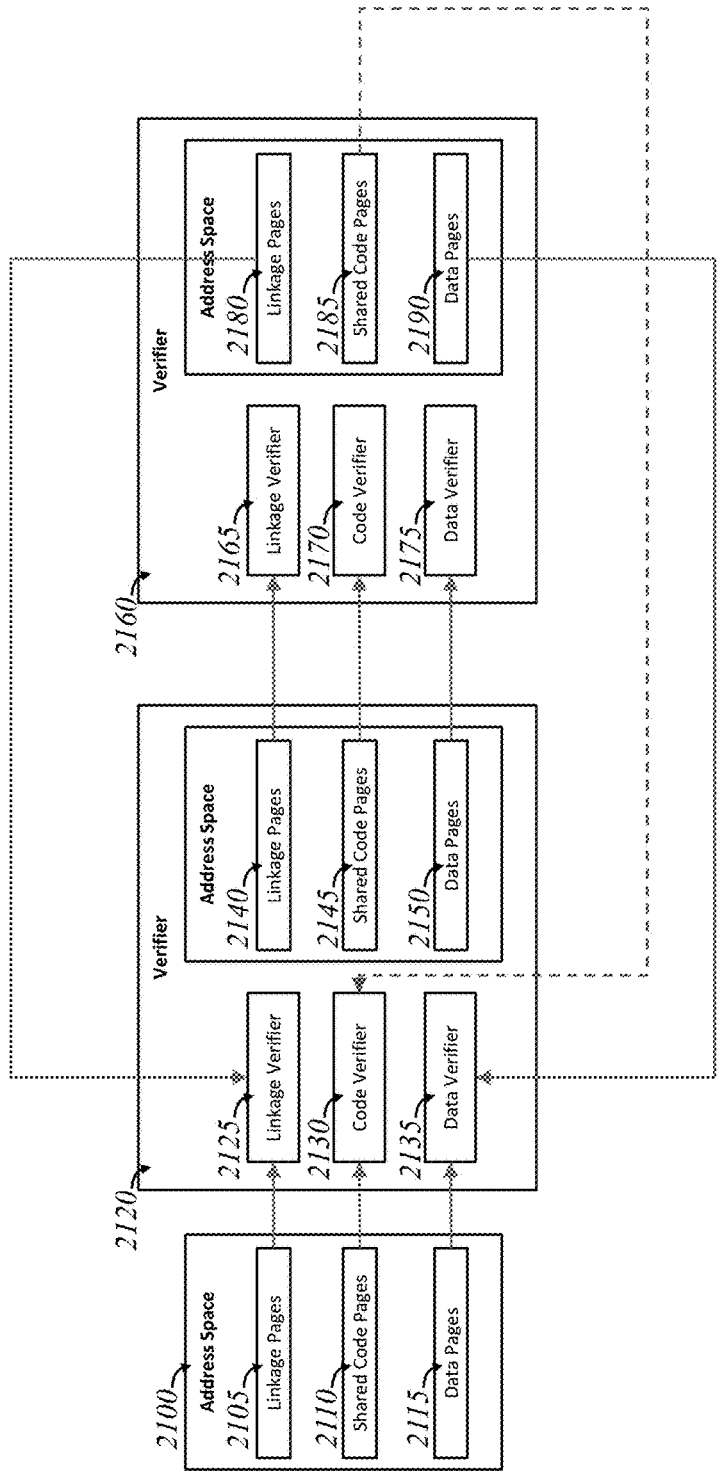
FIG. 21 is a diagram of an embodiment of the invention, showing cyclical verification with a first verifier verifying a second verifier, which itself is verifying the first verifier and another application.

Furthermore, some embodiments use cyclical verification, such as shown in FIG. 21. The leftmost verifier 2120 is shown verifying the address space 2100 of a program or execution unit. However, it is also shown verifying the address space of the rightmost verifier 2160. The rightmost verifier 2160 is shown verifying the address space of the leftmost verifier 2120. In this case, two verifiers are joined together, verifying each other's behavior. However, an arbitrary interconnect of verifiers is established in some embodiments, thus allowing multiple verifiers to verify some other verifiers along with their own non-verifier address space load. So long as every verifier is reachable in a cycle, there is no root verifier whose own compromise can alone impugn the system.

Figure 22:
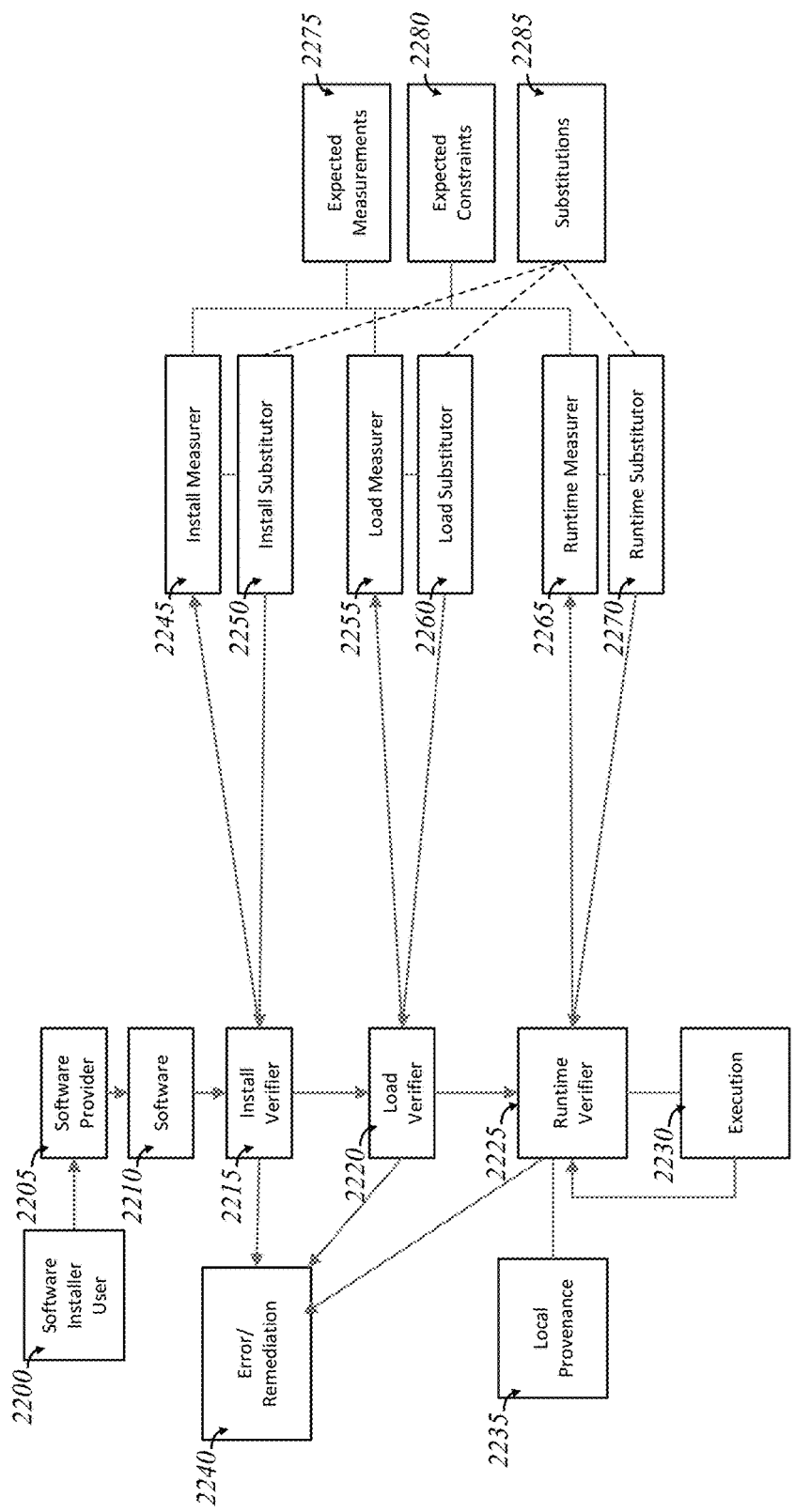
FIG. 22 is a diagram of an embodiment of the invention, showing the runtime application of substitutions to a running verified application.

Some embodiments are capable of performing substitutions. A substitution is a modification of the runtime environment by changing or replacing part or all of the code or files. FIG. 22 shows the substitutions possible in some embodiments. In some embodiments, a verifier or verifiers, after identifying the files to be installed (2215), the code to be loaded (2220), or the pages being executed (2225), performs the substitutions appropriate to the phase and provided to it (such as from an analyzer). As mentioned in detail before, the substitutions can be any change, including hardened versions, with the benefits provided. When a modification or replacement occurs, the verifiers should also be provided with measurements for the measurers that include the substitutions. Some embodiments of a install substitutor 2250 will modify or replace, based on the lists of modifications or replacements provided in substitutions block 2285, the files in different ways: some make the changes to the files in the installation package itself; some replace the files after installation; some replace the entire installation package with one that has the substitutions (including by asking for the entire package's substitution, or by rolling a new installation package based on the original installation package but with the changes), and some alter the files and alter the installation manifests to allow unrolling. Some embodiments of the load substitutor 2260 redirect the loader to access a new file or files containing the modifications or substitutions; some create "virtual" files by intercepting the file access functions used by the loader and replacing the results; some make the modifications after the loader has performed some or all of its work (such as by modifying memory and remapping or moving segments or partial regions within). Some embodiments of the runtime substitutor 2270 perform page modifications or on-the-fly remappings; some create new pages and introduce trampolines or similar jump points or redirections to cause the changes to take effect; some modify data or vtables to point to the modifications. The choice of modification method depends in part on the modification to be made and the available room in the original atom to take the change: some embodiments provide explicit instructions of how the modifications are to be made (such as in delivering scripts, tokens, or code that makes the changes); some provide the manifest of the changes and the local substitutors determine based on the resources and constraints (such as available memory, time, and impact on verification) to make the substitutions. In this way, an entire program can be swapped with another one at any point the embodiment supports, thus running B for A. Usually, the expectation is that B is A plus some small modifications, but that need not be the case.

Because many embodiments depend on cryptographic functions, the ability of a system to provide a good source of randomness may be necessary. However, the existing random generation techniques tend to have limitations. Pseudorandom number generators often suffer for a lack of sufficient entropy, or for leaking information. Hardware random number generators are often sensitive to the environment: quantum diodes can depend on externalities such as temperature.

Figure 23:
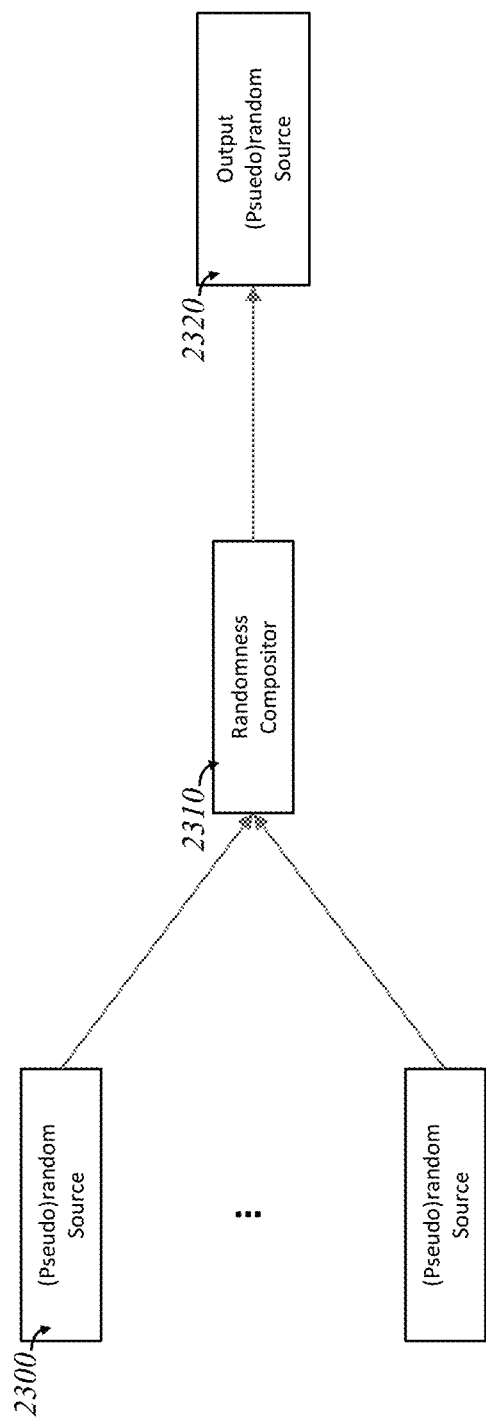
FIG. 23 is a diagram of an embodiment of the invention, showing the composition of randomness.

FIG. 23 shows the random compositor of some embodiments. Random compositing is merging of multiple pseudorandom or random streams into one (or more if necessary) streams with different properties usually than the original streams alone. The inputs 2300 need not be all of the same type, and can be a mix of hardware, software, random, and pseudorandom. Some embodiments of a compositor 2310 perform bit-wise arithmetic between the sources: specifically, some perform a binary XOR. A value of performing an XOR is that, in theory, a bit that is truly random XORed to a bit that may not be results in a bit that is indistinguishable from random. This allows here the possible benefit that, as the different streams wax or wane in their degree of randomness, the apparent randomness of the resulting stream should be no worse than the most random bit at the time. For example, imagine two streams, one of which is only random every even bit, and one that is random only every odd bit: together, their XOR is indistinguishable from randomness. Of course, the loss of randomness can occur in sync. Statistically, that will happen every once in a while in independent random streams, and can be avoided by using more streams up to the level of assurance desired. Furthermore, it is not necessarily the case that the randomness fluctuations are independent in each stream. An attacker may be able to influence multiple streams simultaneously. A PNRG that depends on I/O behavior can be starved of entropy by blocking I/O. One that depends on interrupt behavior can be starved by uninterruptable code interfering with its gathering. Both will be impacted if the attacker disables interrupts. Two hardware noisy diodes that are temperature sensitive may covary if the temperature is lowered, say by spray coolant. However, streams of different types that are composed can still offer protection: an entropy pooling software PRNG, a hardware PRNG, and a hardware quantum RNG can be composited (and are in at least one embodiment), and the attacker will have to mount simultaneous attacks to weaken the composited stream as the stream should be as strong as its weakest input. Some embodiments introduce delays, such as arbitrary, random or calculated, into producing output. Some embodiments compose by using multibit operations: some use binary matrices operating on bit vectors derived from source streams; some use block manipulations and substitutions. In all cases, the number of bits in use and the operations in use can itself be based on random inputs (or even stream state, including future stream calculated by or requested from the inputs the compositor but state not yet emitted). For example, one embodiment performs bit interleaving of the streams, but uses its own random state to derive which stream and how many bits will be shuffled: picture one where the first stream is taken a byte at a time, with the high nibble specifying which other stream number to pull from (mod the number of streams, limit 16), and the low specifying the number of bits. The first stream's output is discarded after the two nibbles are used to produce the appropriate output. Some embodiments compose recursively, and this itself can be hierarchical or even partially or totally cyclical (such as where previous output feeds current input).

The analyses disclosed above are provided by some embodiments at least in part as a service across a network, interconnect, or IPC; some embodiments have analyzers collocated with one or more verifiers. Some embodiments of the analysis service may be operated in a cloud environment, or on premises, or a mixture of both. As a service, the analysis can operate in a range of execution duties, from as needed to occasional to triggered to continuous, refining the analyses as needed.

Figure 24:
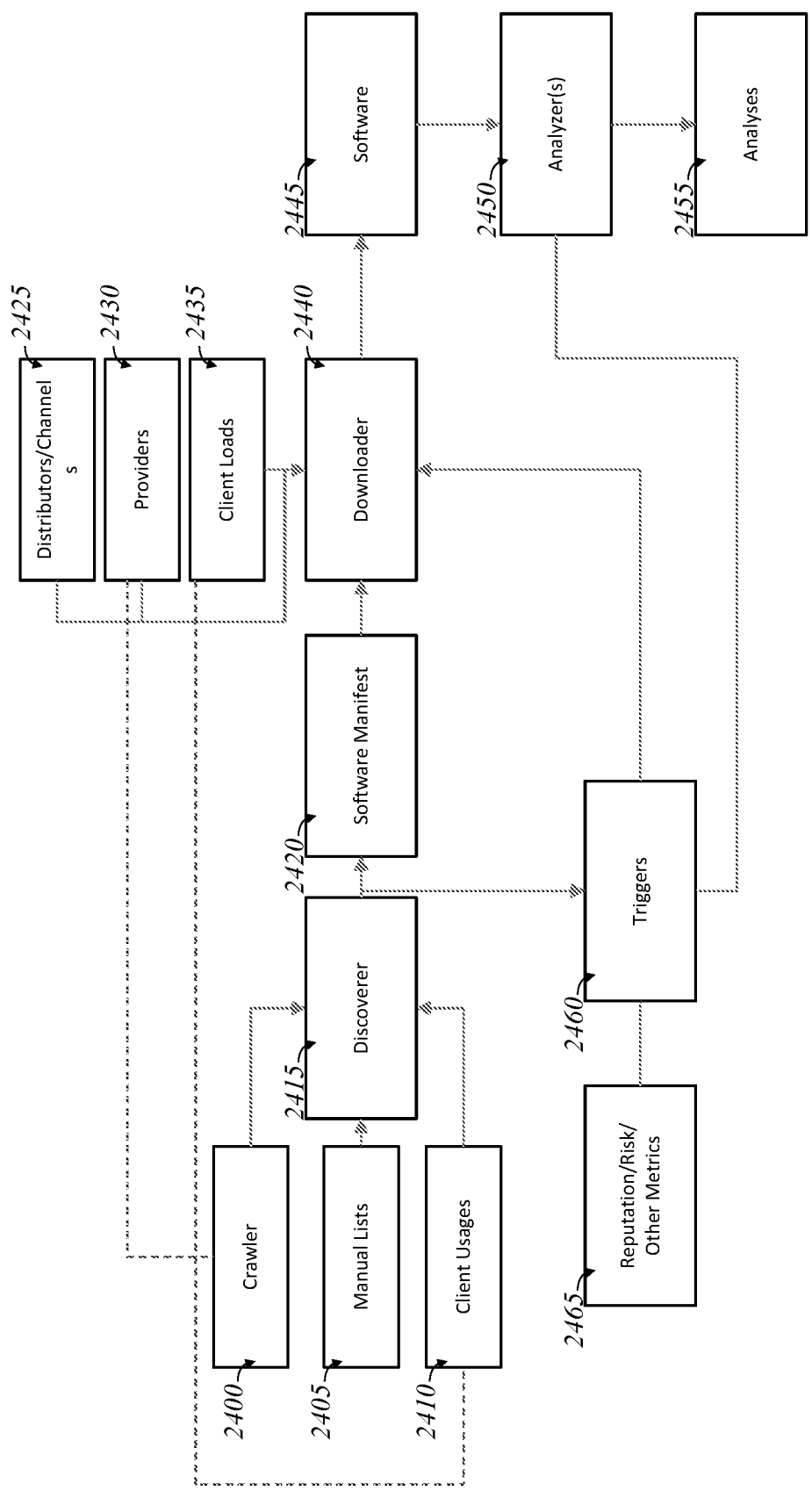
FIG. 24 is a diagram of an embodiment of the invention, showing the discovery of new software images.

FIG. 24 shows how some embodiments perform the analysis service. A discoverer 2415 updates a software manifest 2420, which may contain the list of known, interesting, or relevant software packages, projects, installations, and such, and how they can be retrieved. Some embodiments update this list by employing a crawler 2400, such as a web or repository crawler, which either registers for updates from primary and secondary sources or searches the appropriate repositories (including the Internet or a subset as a web crawler, or a local or remote repository or aggregator such as Github). Some embodiments employ manual lists 2405 which supplement or fill the discoverer. Some embodiments capture client/user/enforcement data 2410: for example, a validator that discovers a piece of software informs the discoverer in some embodiments. A downloader 2440 downloads software 2445 into the software repository for analysis: sources include but are not limited to providers 2430, distributors or distribution channels 2425 (such as packagers, distributions, prebuilt downloads, bundles, etc.), and client access 2435 to their software (such as a client pushed upload or an on demand load from the client). The software is then analyzed by an analyzer 2450 and analyses 2455 are stored. Some embodiments perform these downloads and/or analyses on a continuous, periodic, or occasional basis (such as intervals, availability of resources to perform the download or analysis, costs for performing the work, etc.). Some embodiments perform the download as triggered by triggers 1460, such as by the update in availability of software. Some embodiments perform the analysis as triggered by any of the following: the creation or change of analysis methods, the expiration of the analyses, the change in dependent information (such as new reputation information or other new metrics that would influence the calculation 2465). Some possible advantages to allowing analysis to operate as a service is that the analyses can be kept refreshed and updated using compute and other resources separate from the enforcement environment. In some embodiments, analysis services are offered on a cloud or network accessible area. In some embodiments, analysis is performed on premises of the user (or deployment area, or alongside deployment), which can provide additional assurances of the security of the analysis itself depending on the environments and risks. In some embodiments, verifiers check with a network-located analysis service to ensure that they have reasonably fresh copies of the analysis and other data. For example, some embodiments host the analyses using HTTP from the analysis service, and verifiers check for freshness using HTTP LMS/Expires caching logic. Further embodiments use a CDN between the service and the client. In some embodiments, if the verifier cannot retrieve the analysis, the verifier pauses or performs some other intermediate remediation behavior (such as displaying to the user that the software cannot be verified, or arranging for the system to resume but the application in question be paused or quit); in some embodiments, the verifier arranges for analysis to take place at another location than the first, or for it to occur locally (even if in a reduced form), to allow forward progress to occur. In some embodiments, analyses occur on a curated, or otherwise managed or filtered, set of applications. In some embodiments, the analyses themselves are chosen and/or curated to reduce the available software that can be run verified—with appropriate permissions on the verifiers, for example, this can limit the software that can be allowed to be ran to that curated set. In some embodiments, multiple analyzers are used. Some further embodiments use a hierarchical set of analyzers: some include a local analyzer, an on-premises analyzer, and a cloud analyzer. In a hierarchy, if an analysis is missing closer to the verifier, the verifier can request further up the analyzer hierarchy searching for hits. In some embodiments, the closer analyzers may not be as complete as the more remote ones: some embodiments, when they find a complete miss in the hierarchy, generate one or more of the closer or simpler analyses while requesting the more complete ones be performed, and substitute analyses when the more complete ones are finished, thus allowing some parallelism in the process.

Figure 25:
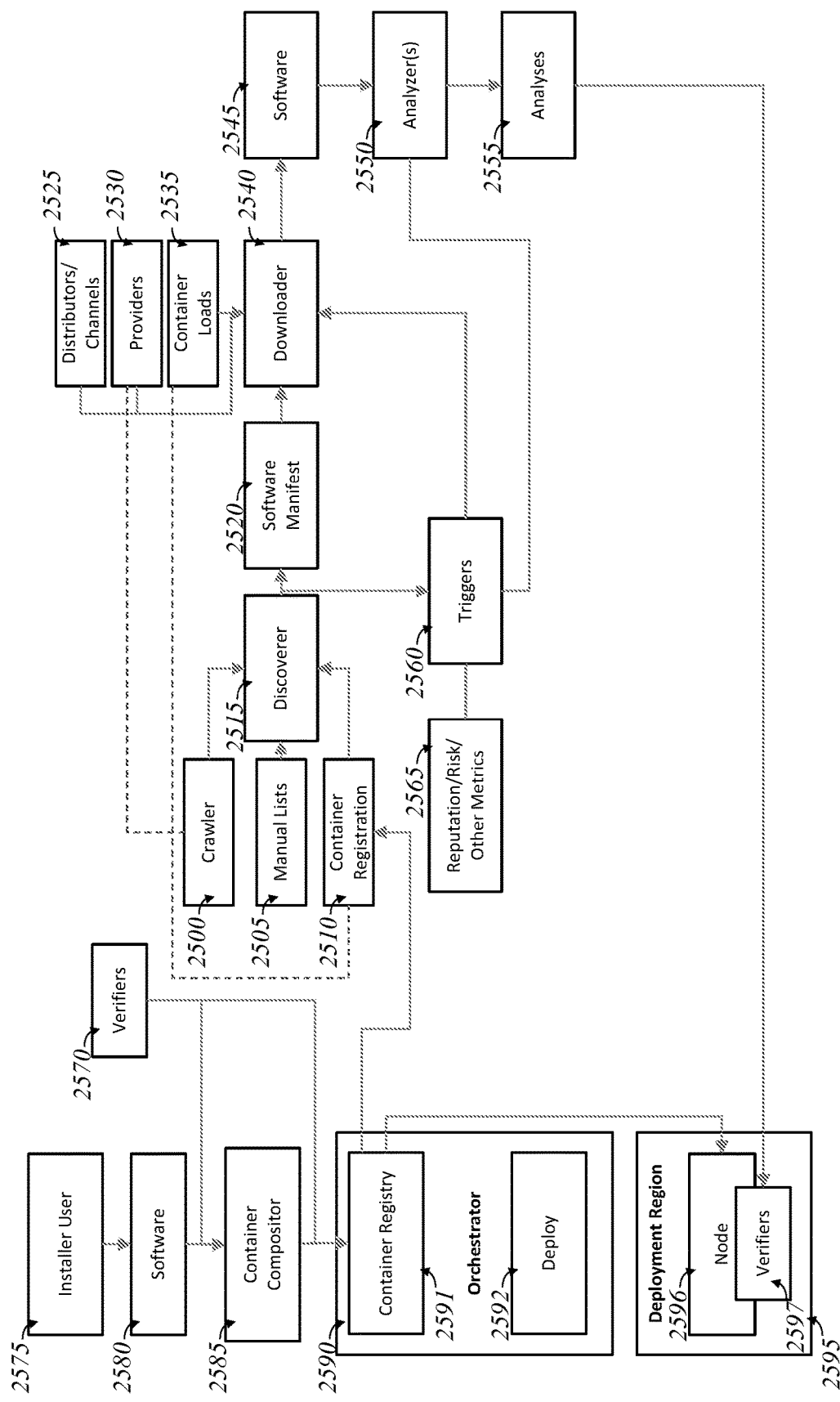
FIG. 25 is a diagram of an embodiment of the invention, showing the integration of software discovery into an orchestrator.

Some embodiments integrate into orchestration, such as shown in FIG. 25. An orchestrator 2590 deploys software to nodes 2596, such as a virtualization orchestrator for using VMs, or a container orchestrator such as a Kubernetes or Docker Swarm. Software is installed into a container registry 2591, usually by an installer user who packages up a VM or a container. In some embodiments, a container compositor 2585 binds verifiers 2570 to the containers to be deployed as 2597, such as in the methods described above (loader wrapping, kernel installation where appropriate [VMs], etc.). In some embodiments, the compositor is not needed, as the verifiers are deployable onto the nodes by the orchestrator itself (such as a verifier container using kernel support or similar to access other containers). In some embodiments, the orchestrator is responsible for maintaining the bare metal installation of the nodes; in some, there is a bare metal deployment scheme (network install, PXE boot, etc.): in some embodiments, the verifiers are installed into the images or integrated into the bare metal deployment scheme to ensure whatever parts of the verifier that need to be beneath the execution environment (hypervisor hooks, kernel hooks, etc., based on the type of virtualization or containerization) as needed. In some embodiments, the container registry update is monitored or integrated into or wrapped by the container registration block, which introduces the availability of a new container or VM into the discoverer. This may occur over the cloud, over a local private network, or other networking scheme. When a workload is deployed to a node, the orchestrator delivers the workload to the node. In some embodiments, the nodes' verifiers access the analyses or other material when introduced to the new workloads. In some embodiments, the orchestrator delivers the verifiers in band with the workloads. In some embodiments, an orchestration verifier packager is introduced to be signaled by the orchestrator upon deployment, and the verifier accesses a precache or preloaded version of the material and delivers it or has the orchestrator deliver it to the verifier. In this way, the verifier may not need a live connection to the analysis framework, and can operate in a disconnected, off-line, or partitioned mode.

In some embodiments, the verifier retains a channel to the orchestrator. Upon an error or remediation, in some of these embodiments, the verifier's remediator asks the orchestrator to refresh/dump and recreate the workload. This may be useful in cases where the workload has been compromised and the compromise has been detected, and now healed. In some embodiments, the workloads' reputation and risk scores are taken into account when determining whether to allow a deployment or to allow a deployment in the specific place: for example, some organizations may request that a highly risky workload not be placed on the same overlay network, or on the same physical network, or in the same microservices domain, or in the same physical node as a more critical workload. In some embodiments, the underlying host is also measured and analyzed. In some embodiments, the host analysis is used in the determination of whether a workload can be placed on that host or not. For example, some embodiments will not allow a high value workload to be placed on a vulnerable or poor reputation host.

This disclosure requires familiarity with the state of the art in software and risk analysis. Terms like "detect" and "infer" are not necessarily absolutes, but may also refer to the increase in a determined value (such as likelihood or probability) or an increase in its confidence.

Throughout this disclosure, multiple specific embodiments are listed that may be extensions of more general embodiments. It is to be understood that the combinations and subprocesses of these embodiments are also taught by this disclosure, as the combinations and subprocesses are able to be anticipated by those skilled in the art upon and only upon reading this disclosure. Furthermore, uses of the plural or the singular do not restrict the number of the item being mentioned: unless explicitly called out as not being so or being logically inconsistent, mentions of singular items are to be construed to also be plural and vice versa.

In the description herein, one or more embodiments of the invention are described, with process steps and functional interactions. Those skilled in the art would realize, after perusal of this application, that embodiments of the invention might be implemented using a variety of other techniques not specifically described, without undue experimentation or further invention, and that such other techniques would be within the scope and spirit of the invention. The use of the words "can" or "may" in regards to the structure and operation of embodiments is to be construed as referring to further embodiments and configuration options, and does not require further experimentation or invention. The scope and spirit of the invention is not limited to specific examples disclosed therein.

Although the invention has been described with reference to several exemplary embodiments, it is understood that such descriptions and illustrations are not limiting. Changes may be made within the purview of the appended claims, as presently stated, without departing from the scope and spirit of the invention in its aspects. Although the invention has been described with reference to particular means, materials, machines, and embodiments, the invention is not intended to be limited to the particulars disclosed; rather, the invention extends to all functionally equivalent structures, methods, machines, and uses such as are within the scope of the invention and claims.

I claim:

1. A method for monitoring the security of software comprising:
   a. receiving, from a software provider associated with a first electronic device over a communication network, by a second electronic device in a cloud environment, a database of software to protect wherein the database of the software at least in part comprises at least one of: an application program executable, source code, a script, just-in-time compiled software, a software package, a distribution, an installer, an archive, and a repository;
   b. downloading, by the second electronic device, an instance of software entered in the database;

c. installing, by the second electronic device, the instance of software;
d. performing, by the second electronic device in a cloud environment, software analysis on the software instance for its security properties;
e. producing, by the second electronic device in the cloud environment at least one part of a hardened version of the software instance, wherein the hardened version is produced at least in part using at least one of a binary translator, a compiler, a linker, and a build system;
f. collecting from a user or an administrator configuration information that determines at least in part a degree or type of security of the hardened version of the software;
g. transmitting, over the communication network, the hardened version of the software to the user associated with a third electronic device,
h. using the monitored environment to modify execution of the software instance by at least one of:
   substituting in memory at least a part of the software instance under execution with at least a part of the hardened binary version of the software instance, and
   issuing traps or breakpoints for the running software instance wherein execution is intercepted and modified from that of the running software instance according to the hardened version,
i. executing, in the third electronic device, the software instance in the monitored environment;
j. verifying aspects of the execution of the software instance within the monitored environment; and
k. collecting from the monitored environment information regarding the operation and verification of the execution of the software instance.

2. The method of claim 1 wherein the software analysis comprises at least in part at least one of: static code analysis, binary analysis, symbolic analysis, code flow analysis, compiler output pattern matching, linker output pattern matching, type analysis, reachability analysis, value analysis, execution and dynamic analysis, and continuous analysis.

3. The method of claim 1 wherein the monitored environment is produced by at least one of: injecting a verifier into the address space and running context of the running software instance, running the verifier in a secure enclave within the address space of the software instance, running at least part of the verifier within the kernel underneath an application to be verified, using kernel tracing from a separate verifier application, and modifying a container containing the software instance to also produce the constructing of the monitored environment.

4. The method of claim 1 wherein the choice of the hardened version is made at least in part based on at least one of: the desired protection level, the efficiency implications of the hardening, and the environment the software instance is executing in.

5. The method of claim 1 comprising further steps of:
a. producing constraints on the behavior of the software instance from the software analysis; and
b. enforcing the constraints on the behavior of the software instance in the monitored environment.

6. The method of claim 1 comprising further step of producing a risk score based at least in part on the software analysis and the information regarding operation and verification of execution of the software instance.

7. The method of claim 6 wherein the risk score is further based at least in part on the software instances's provenance comprising at least in part at least one of—the identities, makeup, reputation, and trustworthiness—of at least one of: the publisher of the software, the project the software belongs to, the version of the software, the files of the software, changes that have been made to the software, people working on the software, organizations involved with the software, organizations to which the people working on the software belong, the relationships between people involved with the project, relationships between organizations involved on the project, relationships between people and organizations involved on the project, processes of the software development, and the openness of the development.

8. The method of claim 6 wherein the risk score is produced at least in part from metrics on at least one of: an install atom of the software instance, a package of the software instance, a local application of the software instance, local system the software instance is on, a container of the software instance, an operating system running the software instance, a virtual machine of the software instance, a hypervisor running the software instance, hardware running the software instance, a network the software instance is connected to, and context of the deployment of the software instance.

9. The method of claim 6 comprising further step of attesting to the trustworthiness of the software instance based at least in part on at least one risk score for the software instance running including any constraints and execution modifications.

10. The method of claim 1 comprising further step of: attesting to the trustworthiness of the software instance based at least in part on verification of the software instance.

11. A system for monitoring the security of software comprising:
a. a software provider associated with a first electronic device;
b. a second electronic device in a cloud environment connected over a communication network to the first electronic device;
c. a database of software from said software provider wherein the database of the software at least in part comprises at least one of: an application program executable, source code, a script, just-in-time compiled software, a software package, a distribution, an installer, an archive, and a repository;
d. an instance of software downloaded, entered in the database, and installed by the second electronic device;
e. a software analyzer that performs on the second electronic device in a cloud environment software analysis on a software instance for its security properties;
f. a hardener that produces on the second electronic device in a cloud environment at least one at least in part hardened version of the software instance, wherein the hardened version is produced at least in part using at least one of a binary translator, a complier, a linker, and a build system;
g. a third electronic device that receives over a communication network the hardened version of the software for a user;
h. a collector that collects from the user or an administrator configuration information that determines at least in part a degree or type of security of the hardened version of the software;
i. a monitored environment on a third electronic device executing the software instance that modifies execution of the software instance by at least one of:

substituting in memory at least a part of the software instance under execution with at least a part of the hardened binary version of the software instance, and issuing traps or breakpoints for the running software instance wherein execution is intercepted and modified from that of the running software instance according to the hardened version;

j. a verifier on the third electronic device that verifies aspects of the execution of the software instance within the monitored environment;

k. a collection from the monitored environment of information regarding the operation and verification of the execution of the software instance.

12. The system of claim 10 wherein the software analysis comprises at least in part at least one of: static code analysis, binary analysis, symbolic analysis, code flow analysis, compiler output pattern matching, linker output pattern matching, type analysis, reachability analysis, value analysis, execution and dynamic analysis, and continuous analysis.

13. The system of claim 10 wherein the monitored environment is produced by at least one of: injecting a verifier into the address space and running context of the running software instance, running the verifier in a secure enclave within the address space of the software instance, running at least part of the verifier within the kernel underneath an application to be verified, using kernel tracing from a separate verifier application, and modifying a container containing the software instance to also produce the constructing of the monitored environment.

14. The system of claim 10 wherein the choice of the hardened version is made at least in part based on at least one of: the desired protection level, the efficiency implications of the hardening, and the environment the software instance is executing in.

15. The system of claim 10 wherein the software analyzer produces constraints on the behavior of the software instance, and constraints on the behavior of the software instance are enforced in the monitored environment.

16. The system of claim 10 comprising further a risk analyzer that produces a risk score based at least in part on the software analysis and the information regarding operation and verification of execution of the software instance.

17. The system of claim 16 wherein the risk score is further based at least in part on the software instances's provenance comprising at least in part at least one of—the identities, makeup, reputation, and trustworthiness—of at least one of: the publisher of the software, the project the software belongs to, the version of the software, the files of the software, changes that have been made to the software, people working on the software, organizations involved with the software, organizations to which the people working on the software belong, the relationships between people involved with the project, relationships between organizations involved on the project, relationships between people and organizations involved on the project, processes of the software development, and the openness of the development.

18. The system of claim 16 wherein the risk score is produced at least in part from metrics on at least one of: an install atom of the software instance, a package of the software instance, a local application of the software instance, local system the software instance is on, a container of the software instance, an operating system running the software instance, a virtual machine of the software instance, a hypervisor running the software instance, hardware running the software instance, a network the software instance is connected to, and context of the deployment of the software instance.

19. The system of claim 16 comprising further an attestor that attests to the trustworthiness of the software instance based at least in part on at least one risk score for the software instance running including any constraints and execution modifications.

20. The system of claim 10 comprising further an attestor that attests to the trustworthiness of the software instance based at least in part on verification of the software instance.

* * * * *